(12) United States Patent
Yoon et al.

(10) Patent No.: US 10,090,903 B2
(45) Date of Patent: Oct. 2, 2018

(54) TERMINAL, METHOD WHEREBY TERMINAL RECEIVES CHANNEL STATUS INFORMATION REFERENCE SIGNALS, BASE STATION, AND METHOD WHEREBY BASE STATION TRANSMITS CHANNEL STATUS INFORMATION REFERENCE SIGNALS

(71) Applicant: PANTECH INC., Seoul (KR)

(72) Inventors: Sung Jun Yoon, Seoul (KR); Jianjun Li, Seoul (KR)

(73) Assignee: PANTECH INC., Seoul (KR)

( * ) Notice: Subject to any disclaimer, the term of this patent is extended or adjusted under 35 U.S.C. 154(b) by 354 days.

(21) Appl. No.: 14/765,766

(22) PCT Filed: Feb. 5, 2014

(86) PCT No.: PCT/KR2014/000956
§ 371 (c)(1),
(2) Date: Nov. 25, 2015

(87) PCT Pub. No.: WO2014/123340
PCT Pub. Date: Aug. 14, 2014

(65) Prior Publication Data
US 2016/0080059 A1   Mar. 17, 2016

(30) Foreign Application Priority Data

Feb. 5, 2013   (KR) .................... 10-2013-0013050

(51) Int. Cl.
*H04B 7/06*   (2006.01)
*H04B 7/0417*   (2017.01)
*H04B 7/04*   (2017.01)

(52) U.S. Cl.
CPC ......... *H04B 7/0626* (2013.01); *H04B 7/0417* (2013.01); *H04B 7/04* (2013.01)

(58) Field of Classification Search
None
See application file for complete search history.

(56) References Cited

U.S. PATENT DOCUMENTS

| 2013/0039203 | A1 | 2/2013 | Fong et al. | |
|---|---|---|---|---|
| 2013/0272151 | A1* | 10/2013 | Thomas | ................ H04W 24/02 370/252 |
| 2014/0098689 | A1* | 4/2014 | Lee | ...................... H04B 7/0469 370/252 |

FOREIGN PATENT DOCUMENTS

WO   2011-100672   8/2011

OTHER PUBLICATIONS

International Search Report dated May 19, 2014 in International Application No. PCT/KR2014/000956.

(Continued)

*Primary Examiner* — Edan Orgad
*Assistant Examiner* — Saumit Shah
(74) *Attorney, Agent, or Firm* — H.C. Park & Associates, PLC

(57) ABSTRACT

The terminal receives channel status information reference signals (CSI-RSs) transmitted from a base station. The terminal includes a configuration information receiving unit for receiving, from the base station, CSI-RS configuration information which includes a number of CSI-RS antenna ports for a horizontal antenna in an antenna array of the base station and information indicating a CSI-RS pattern for the horizontal antenna in a particular subframe, a configuration identification unit for extracting a number of CSI-RS antenna ports for a vertical antenna and a CSI-RS pattern for the vertical antenna, based on the number of CSI-RS antenna ports for the horizontal antenna and the information indicating CSI-RS pattern for the horizontal antenna, when it is determined that a CSI-RS for the vertical antenna is trans- (Continued)

mitted, and a reference signal reception unit for receiving the CSI-RS for the horizontal antenna and the CSI-RS for the vertical antenna.

12 Claims, 11 Drawing Sheets

(56) References Cited

OTHER PUBLICATIONS

Alcatel-Lucent Shanghai Bell et al., "Considerations on CSI feedback enhancements for high-priority antenna configuration", R1-112420, 3GPP TSG-RAN WG1 #66, Aug. 22-26, 2011, Athens, Greece.
Samsung, "Prioritization of CSI feedback enhancement scenarios for DL-MIMO", R1-112515, 3GPP TSG RAN WG1 Meeting #66, Aug. 22-26, 2011, Athens, Greece.
Motorola Mobility, "Scenario and Modeling Discussion for DL-MIMO Enhancements", R1-112444, 3GPP TSG RAN1 #66, Aug. 22-26, 2011, Athens, Greece.
Alcatel-Lucent, "Deployment Scenarios and Assumptions", R4-123072, 3GPP TSG RAN WG4 Meeting #63, May 21-25, 2012, Prague, Czech Republic.

* cited by examiner

*FIG.4*

TERMINAL, METHOD WHEREBY TERMINAL RECEIVES CHANNEL STATUS INFORMATION REFERENCE SIGNALS, BASE STATION, AND METHOD WHEREBY BASE STATION TRANSMITS CHANNEL STATUS INFORMATION REFERENCE SIGNALS

CROSS-REFERENCE TO RELATED APPLICATION

This application is the National Stage Entry of International Application No. PCT/KR2014/000956, filed on Feb. 5, 2014, and claims priority from and the benefit of Korean Patent Application 10-2013-0013050 filed in Korea on Feb. 5, 2013, each of which is hereby incorporated by reference for all purposes as if fully set forth herein.

BACKGROUND

Field

The present invention relates to a reference signal for measuring a channel status in a wireless communication system.

Discussion of the Background

In a wireless communication system, in order to allow a transmitter to select an appropriate data rate, namely, in order to select an appropriate modulation scheme and an appropriate channel coding rate, the transmitter needs to know information on a wireless link channel status. The information is also required for scheduling according to a channel.

In downlink, each of most systems provides a downlink signal having a predetermined structure, such as a downlink reference signal (e.g., a Channel Status Information Reference Signal (CSI-RS)). The RS may be transmitted in a state of having predetermined power by a base station and may be used to allow a user equipment to estimate a downlink channel status. Information on the downlink channel status estimated by the user equipment may be subsequently reported to the base station.

In the case of a downlink multiple-antenna transmission, a user equipment needs to be able to estimate a downlink channel of each transmission antenna. To this end, one downlink RS is transmitted for each antenna port.

In 3rd Generation Partnership Project (3GPP) Long Term Evolution (LTE) Rel-10/11, in the case of downlink, a maximum of 8 transmission antenna ports may be one-dimensionally configured in a base station. Meanwhile, in a subsequent system, in the case of downlink, a case may be considered in which a maximum of 64 transmission antenna ports are two-dimensionally configured. Accordingly, there is a need for a method for configuring downlink RSs for more transmission antenna ports.

SUMMARY

An aspect of the present invention is to provide an apparatus and a method for configuring CSI-RS resources in each of horizontal and vertical directions in view of a two-dimensional antenna configuration.

In accordance with an aspect of the present invention, there is provided a user equipment for receiving a Channel Status Information Reference Signal (CSI-RS) transmitted by a base station. The user equipment includes: a configuration information reception unit for receiving, from the base station, CSI-RS configuration information including information on the number of CSI-RS antenna ports for a horizontal antenna in an antenna array of the base station, and information indicating a CSI-RS pattern used for a CSI-RS for the horizontal antenna in a particular subframe; a configuration identification unit for extracting the number of CSI-RS antenna ports for a vertical antenna and a CSI-RS pattern for the vertical antenna, based on the information on the number of the CSI-RS antenna ports for the horizontal antenna and the information indicating the CSI-RS pattern for the horizontal antenna, when it is determined that a CSI-RS for the vertical antenna is transmitted; and an RS reception unit for receiving the CSI-RS for the horizontal antenna and the CSI-RS for the vertical antenna.

In accordance with another aspect of the present invention, there is provided a method in which a user equipment receives a Channel Status Information Reference Signal (CSI-RS) transmitted by a base station. The method includes: receiving, from the base station, CSI-RS configuration information including information on the number of CSI-RS antenna ports for a horizontal antenna in an antenna array of the base station, and information indicating a CSI-RS pattern used for a CSI-RS for the horizontal antenna in a particular subframe; extracting the number of CSI-RS antenna ports for a vertical antenna and a CSI-RS pattern for the vertical antenna, based on the information on the number of the CSI-RS antenna ports for the horizontal antenna and the information indicating the CSI-RS pattern for the horizontal antenna, when it is determined that a CSI-RS for the vertical antenna is transmitted; and receiving the CSI-RS for the horizontal antenna and the CSI-RS for the vertical antenna.

In accordance with still another aspect of the present invention, there is provided a base station for transmitting a Channel Status Information Reference Signal (CSI-RS). The base station includes: a configuration information transmission unit for transmitting CSI-RS configuration information including information on the number of CSI-RS antenna ports for a horizontal antenna in an antenna array of the base station, and information indicating a CSI-RS pattern used for a CSI-RS for the horizontal antenna in a particular subframe; and an RS transmission unit for transmitting the CSI-RS for the horizontal antenna and a CSI-RS for a vertical antenna, wherein the number of CSI-RS antenna ports for the vertical antenna and a CSI-RS pattern for the vertical antenna are determined based on the information on the number of the CSI-RS antenna ports for the horizontal antenna and the information indicating the CSI-RS pattern for the horizontal antenna, when the CSI-RS for the vertical antenna is transmitted.

In accordance with yet another aspect of the present invention, there is provided a method for transmitting a Channel Status Information Reference Signal (CSI-RS) by a base station. The method includes: transmitting CSI-RS configuration information including information on the number of CSI-RS antenna ports for a horizontal antenna in an antenna array of the base station, and information indicating a CSI-RS pattern used for a CSI-RS for the horizontal antenna in a particular subframe; and transmitting the CSI-RS for the horizontal antenna and a CSI-RS for a vertical antenna, wherein the number of CSI-RS antenna ports for the vertical antenna and a CSI-RS pattern for the vertical antenna are determined based on the information on the number of the CSI-RS antenna ports for the horizontal antenna and the information indicating the CSI-RS pattern for the horizontal antenna, when the CSI-RS for the vertical antenna is transmitted.

The above-described present invention enables CSI-RS resources to be configured in each of horizontal and vertical directions in view of a two-dimensional antenna configuration.

BRIEF DESCRIPTION OF THE DRAWINGS

FIGS. 3 and 4 each illustrate an example of a CSI-RS pattern within a subframe.

DETAILED DESCRIPTION OF THE ILLUSTRATED EMBODIMENTS

Figure 1:
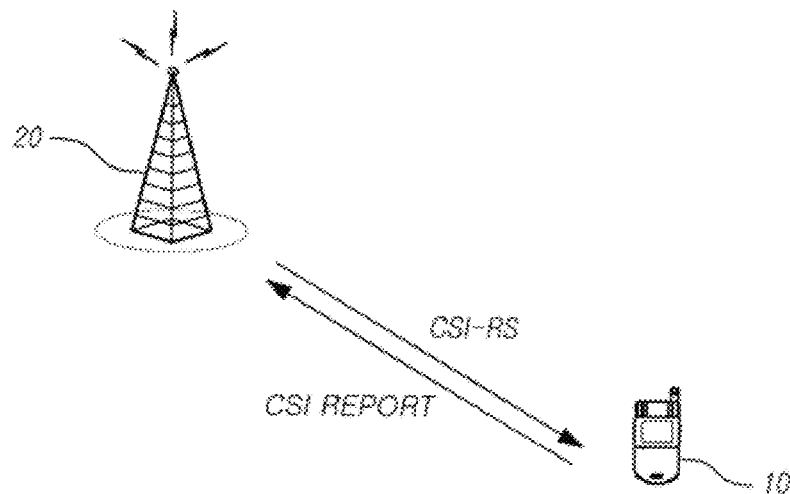
FIG. 1 illustrates an example of a wireless communication system to which embodiments of the present invention are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates an example of a wireless communication system to which embodiments of the present invention are applied.

Referring to FIG. 1, the wireless communication system may include a User Equipment (UE) 10 and a Base Station (BS) 20 that performs uplink and downlink communication with the UE 10.

In this specification, the UE 10 has a comprehensive concept implying a terminal in wireless communication. Accordingly, the UEs should be interpreted as a concept including a Mobile Station (MS), a User Terminal (UT), a Subscriber Station (SS), a wireless device, and the like in Global System for Mobile Communications (GSM) as well as User Equipments (UEs) in Wideband Code Division Multiple Access (WCDMA), Long Term Evolution (LTE), High Speed Packet Access (HSPA), and the like.

The BS 20 typically refers to a station communicating with the UE 10, and may be called different terms, such as a Node-B, an evolved Node-B (eNodeB), a sector, a site, a Base Transceiver System (BTS), an Access Point (AP), a relay node, and the like.

Also, the BS 20 has a comprehensive meaning including various coverage areas, such as a megacell, a macrocell, a microcell, a picocell, a femtocell, a Radio Resource Head (RRH), a communication range of a relay node, and the like.

Further, the BS 20 may be referred to as a "Transmission Point (TP)" from the viewpoint that the BS 20 transmits downlink communication to the UE 10, and may be referred to as a "Reception Point (RP)" from the viewpoint that the BS 20 receives uplink communication from the UE 10. Alternatively, the BS 20 may be referred to as a "point" or a "transmission and reception point."

The BS 20 transmits, to the UE 10, a CSI-RS as an RS for estimating a downlink channel status, the UE 10 estimates a downlink channel status by using the received CSI-RS, and the UE 10 transmits, to the BS 20, Channel Status Information (CSI) through an uplink channel, such as a Physical Uplink Control CHannel (PUCCH) or a Physical Uplink Shared CHannel (PUSCH).

Figure 2:
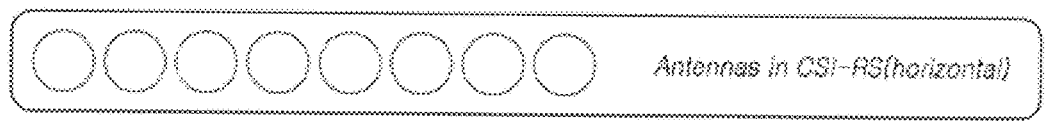
FIG. 2 illustrates an example of one-dimensionally configuring an antenna array of a base station.

In the 3GPP LTE Rel-10/11, for downlink, a maximum of 8 transmission antenna ports may be one-dimensionally configured in the BS. FIG. 2 illustrates an example in which antennas of a BS are horizontally and one-dimensionally configured. In this case, the number of CSI-RS antenna ports is equal to a maximum of 8.

For a CSI-RS, signaling parameters from a higher layer, such as Radio Resource Control (RRC), may be as follows.

1) antennaPortsCount: is a value of a total of 2 bits and indicates the number of antenna ports used to transmit a CSI-RS.

2) resourceConfig: is a value of a total of 5 bits and indicates resources (i.e., a CSI-RS pattern) used to transmit a CSI-RS in a particular subframe. The CSI-RS pattern corresponds to an index of 'CSI reference signal configuration' in Tables 1 and 2 below. Accordingly, in the present invention, a CSI-RS pattern number signifies the index of 'CSI reference signal configuration' in Table 1 below or Table 2 below which is indicated by the 'resourceConfig.' Specifically, CSI-RS pattern A signifies a CSI-RS formed from CSI-RS configuration A in Table 1 below or Table 2 below.

3) subframeConfig: is a value of a total of 8 bits and indicates a subframe used to transmit a CSI-RS.

4) Pc: indicates a value related to CSI-RS transmission power.

In addition, when a Coordinated Multi-Point transmission and reception (CoMP) environment is considered, a value $N_{ID}^{CSI}$, which may replace a cell ID $N_{ID}^{cell}$, may also be signaled through a higher layer, such as RRC and the like.

Hereinafter, parameters antennaPortsCount, resourceConfig, and subframeConfig will be described in more detail.

The number of CSI-RS antenna ports may be equal to one of 1, 2, 4, and 8, and the value of antennaPortsCount of 2 bits may be used to indicate one of 1, 2, 4, and 8.

A CSI-RS pattern may be determined by Tables 1 and 2 below and Equation 1 below. Table 1 below is a table for a case of a normal Cyclic Prefix (CP), and Table 2 below is a table for a case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | 9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

$$a_{k,l}^{(p)} = w_{l''} * r_{l,n_s}(m') \qquad \text{Equation 1}$$

where $$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} =
\begin{cases}
1 & p \in \{15, 17, 19, 21\} \\
(-1)^{l''} & p \in \{16, 18, 20, 22\}
\end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Referring to Tables 1 and 2, values of (k', l') and a slot allocated a CSI-RS may be determined by the number of CSI-RS antenna ports and CSI-RS configuration information resourceConfig of 5 bits.

In Equation 1, $a_{k,l}^{(p)}$ represents a complex symbol mapped to a k-th subcarrier and an l-th symbol of a p-th antenna port. From Equation 1, it can be noted that $a_{k,l}^{(p)}$ is made to match by multiplying a CSI-RS sequence $r_{l,n_s}(m')$ by w".

In Equation 1, values of k' and l' are determined by Table 1 or Table 2. In Equation 1, $N_{RB}^{DL}$ represents the number of DownLink (DL) Resource Blocks (RBs), and $N_{RB}^{max,DL}$ represents the maximum number of DL RBs.

As can be noted in Table 1, in the case of a normal CP, when the number of antenna ports is equal to 1 or 2, a total of 32 CSI-RS patterns exist. When the number of antenna ports is equal to 4, a total of 16 CSI-RS patterns exist. When the number of antenna ports is equal to 8, a total of 8 CSI-RS patterns exist.

Figure 3:
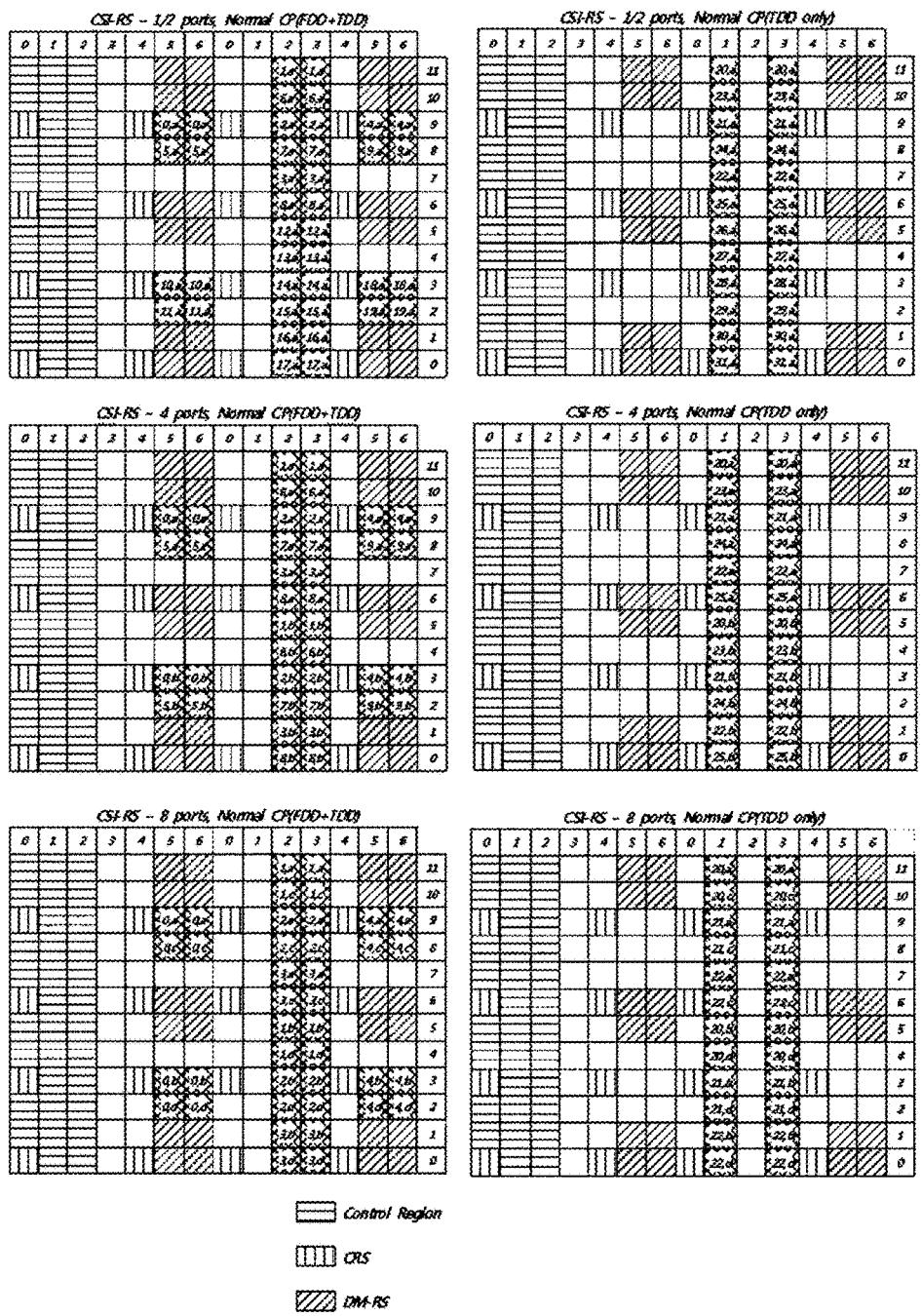

FIG. 3 illustrates a CSI-RS pattern within a subframe in the case of a normal CP. In FIG. 3, each number represents a CSI-RS configuration number in Table 1, and a, b, c, and d respectively represent Resource Elements (REs) to which CSI-RSs of antenna ports {15,16}, {17,18}, {19,20}, and {21,22} are mapped.

As can be noted in FIG. 3, resources, to which a CSI-RS pattern is mapped when the number of antenna ports is equal to 8, include two resources to which CSI-RS patterns are mapped when the number of antenna ports is equal to 4. Here, the resources, to which CSI-RS patterns are mapped when the number of antenna ports is equal to 4, include two resources to which CSI-RS patterns are mapped when the number of antenna ports is equal to 1 or 2. For example, as can be noted in FIG. 3, resources, to which CSI-RS pattern 0 is mapped when the number of antenna ports is equal to 8, include a resource, to which CSI-RS pattern 0 is mapped when the number of antenna ports is equal to 4, and a resource to which CSI-RS pattern 5 is mapped when the number of antenna ports is equal to 4. Here, the resource, to which CSI-RS pattern 0 is mapped when the number of antenna ports is equal to 4, includes a resource, to which CSI-RS pattern 0 is mapped when the number of antenna ports is equal to 1 or 2, and a resource to which CSI-RS pattern 10 is mapped when the number of antenna ports is equal to 1 or 2.

As can be noted in Table 2, in the case of the extended CP, a total of 28 CSI-RS patterns exist when the number of antenna ports is equal to 1 or 2, a total of 14 CSI-RS patterns exist when the number of antenna ports is equal to 4, and a total of 7 CSI-RS patterns exist when the number of antenna ports is equal to 8.

Figure 4:
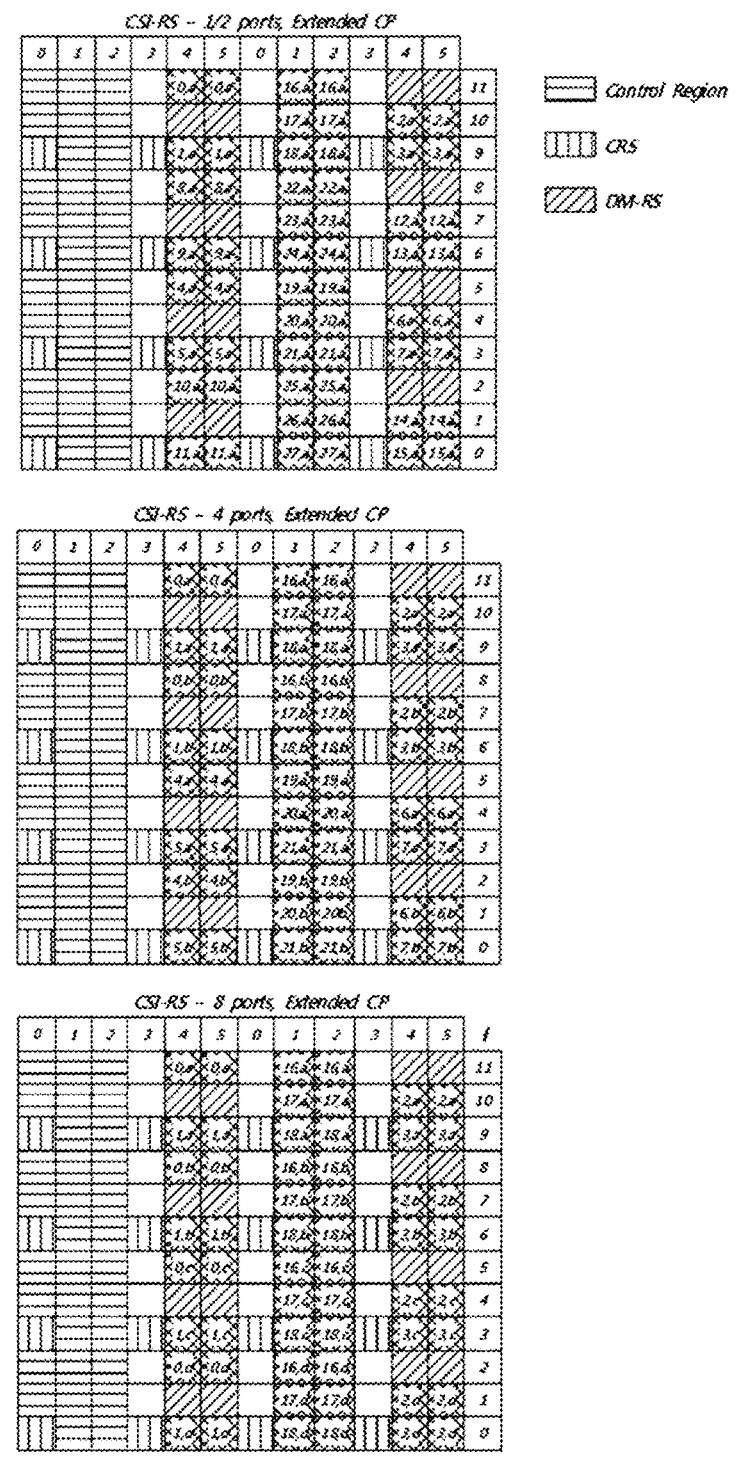

FIG. 4 illustrates a CSI-RS pattern within a subframe in the case of an extended CP. In FIG. 4, each number represents a CSI-RS configuration number in Table 2, and a, b, c, and d respectively represent REs to which CSI-RSs of antenna ports {15,16}, {17,18}, {19,20}, and {21,22} are mapped.

As can be noted in FIG. 4, resources, to which a CSI-RS pattern is mapped when the number of antenna ports is equal to 8, include two resources to which CSI-RS patterns are mapped when the number of antenna ports is equal to 4. Here, the resources, to which CSI-RS patterns are mapped when the number of antenna ports is equal to 4, include two resources to which CSI-RS patterns are mapped when the number of antenna ports is equal to 1 or 2. For example, as can be noted in FIG. 4, resources, to which CSI-RS pattern 0 is mapped when the number of antenna ports is equal to 8, include a resource, to which CSI-RS pattern 0 is mapped when the number of antenna ports is equal to 4, and a resource to which CSI-RS pattern 4 is mapped when the number of antenna ports is equal to 4. Here, the resource, to which CSI-RS pattern 0 is mapped when the number of antenna ports is equal to 4, includes a resource, to which CSI-RS pattern 0 is mapped when the number of antenna ports is equal to 1 or 2, and a resource to which CSI-RS pattern 8 is mapped when the number of antenna ports is equal to 1 or 2.

FIGS. 3 and 4 illustrate resources to which a control region, a Cell-specific Reference Signal (CRS), and a DeModulation Reference Signal ((DM-RS) or a UE-specific Reference Signal) are mapped. Although a control region is illustrated as using three Orthogonal Frequency Division Multiplexing (OFDM) symbols in FIGS. 3 and 4, the control region may use one to four OFDM symbols. Although a DM-RS is illustrated as using two Code Division Multiplexing (CDM) groups in FIGS. 3 and 4, the DM-RS may use one CDM group.

A subframe in which a CSI-RS is transmitted may be indicated by subframeConfig of 8 bits. The CSI-RS may be transmitted at a cycle of 5 ms, 10 ms, 20 ms, 40 ms, or 80 ms, and a cycle and an offset of a subframe, in which the CSI-RS is transmitted, may be determined by Table 3 below.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |

TABLE 3-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, in a wireless communication system described below, a configuration of a two-dimensional antenna array may be considered. In order to estimate a channel status of the two-dimensional antenna array, it is necessary to configure additional CSI-RS resources for a vertical direction as well as CSI-RS resources for a horizontal direction.

Figure 5:
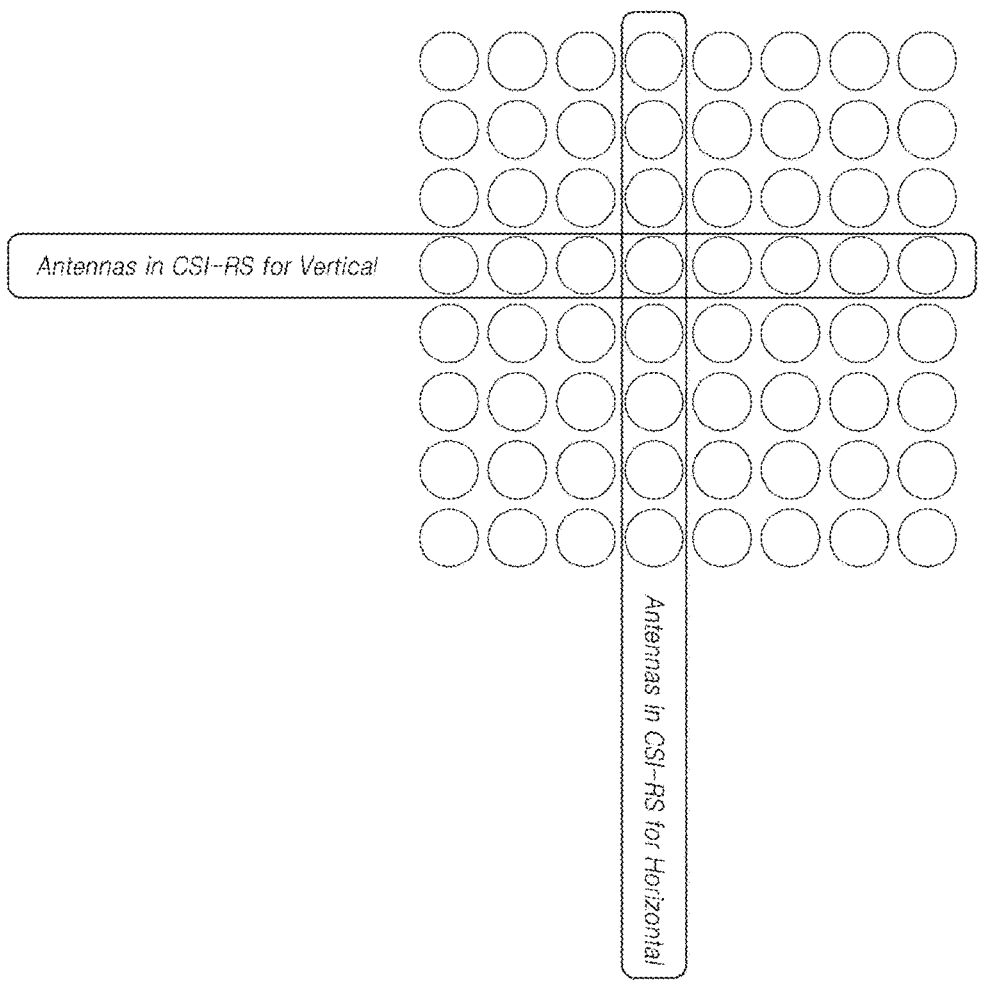
FIG. 5 illustrates an example of two-dimensionally configuring an antenna array of a base station.

FIG. 5 illustrates an example of two-dimensionally configuring an antenna array of a BS. FIG. 5 illustrates an example in which a transmission antenna array of the BS is formed by 64 (8×8) antennas. In this case, the BS does not need to transmit CSI-RSs for all of the 64 antennas, and may configure a total of 16 CSI-RS antenna ports in such a manner as to add 8 horizontal antennas and 8 vertical antennas together.

At this time, the BS may configure a CSI-RS for the horizontal direction and a CSI-RS for the vertical direction, and may signal information on the configuration to a UE. Specifically, the BS may signal, to the UE, information on antennaPortsCount (2 bits), resourceConfing (5 bits), and subframeConfig (8 bits) related to each of the CSI-RS for the horizontal direction and the CSI-RS for the vertical direction. This scheme may cause an increase in signaling overhead of a total of 15 bits.

Embodiments of the present invention as described below will provide a method for reducing signaling overhead (a total of 15 bits).

In an embodiment of the present invention, a CSI-RS for the horizontal direction and a CSI-RS for the vertical direction may be set to be transmitted in an identical subframe, and subframeConfig of 8 bits related to the CSI-RS for the vertical direction may be omitted. Specifically, the BS may signal subframeConfig of 8 bits related to the CSI-RS for the horizontal direction of 8 bits, and the UE may know that not only the CSI-RS for the horizontal direction but also the CSI-RS for the vertical direction are transmitted in a subframe indicated by subframeConfig.

Meanwhile, the number of antenna ports and a pattern of a CSI-RS for the vertical direction may be indicated as in an embodiment of the present invention as described below.

A first embodiment: one bit is added to configuration information for a CSI-RS for the horizontal direction.

In the first embodiment, one bit is added to antennaPortsCount of 2 bits, resourceConfing of 5 bits, and subframeConfig of 8 bits related to the CSI-RS for the horizontal direction. The added one bit may be added in such a manner that 2 bits of antennaPortsCount are changed to 3 bits in an example, or a new field (e.g., verticalAntennaConfig) of 1 bit is defined in another example.

A value indicated by the existing antennaPortsCount of 2 bits may be as in Table 4 below.

TABLE 4

| antennaPortsCount | Number of CSI-RS configured |
|---|---|
| 00 | (horizontal direction) 1 |
| 01 | (horizontal direction) 2 |

TABLE 4-continued

| antennaPortsCount | Number of CSI-RS configured |
|---|---|
| 10 | (horizontal direction) 4 |
| 11 | (horizontal direction) 8 |

In an example, a value indicated by antennaPortsCount of 3 bits may be as in Table 5 below.

TABLE 5

| antennaPortsCount | Number of CSI-RS configured |
|---|---|
| 000 | (horizontal direction) 1 |
| 001 | (horizontal direction) 2 |
| 010 | (horizontal direction) 4 |
| 011 | (horizontal direction) 8 |
| 100 | (horizontal direction × vertical direction) 4 × 4 |
| 101 | (horizontal direction × vertical direction) 8 × 2 |
| 110 | (horizontal direction × vertical direction) 8 × 4 |
| 111 | (horizontal direction × vertical direction) 8 × 8 |

In Table 5, a case where the value of antennaPortsCount of 3 bits is equal to '0XX' is a case where only a CSI-RS for the horizontal direction is used, and may be identical to a case of 'XX' of 2 bits in Table 4.

A case where the value of antennaPortsCount of 3 bits is equal to '1XX' is a case where a CSI-RS for the horizontal direction and a CSI-RS for the vertical direction are used, and may indicate a case where the number of antenna ports for CSI-RSs for the horizontal direction is equal to 4 and the number of antenna ports for CSI-RSs for the vertical direction is equal to 4, a case where the number of antenna ports for CSI-RSs for the horizontal direction is equal to 8 and the number of antenna ports for CSI-RSs for the vertical direction is equal to 2, a case where the number of antenna ports for CSI-RSs for the horizontal direction is equal to 8 and the number of antenna ports for CSI-RSs for the vertical direction is equal to 4, and a case where the number of antenna ports for CSI-RSs for the horizontal direction is equal to 8 and the number of antenna ports for CSI-RSs for the vertical direction is equal to 8.

Table 5 shows examples of cases of 4×4, 8×2, 8×4, and 8×8 as two-dimensional antenna arrays. These antenna arrays are selected by principles in which (1) the number of horizontal antennas and the number of vertical antennas are both an exponential of 2, (2) the number of horizontal antennas is greater than or equal to the number of vertical antennas, and (3) cases where the number of antennas is equal to 1, 2, 4, and 8 as in the conventional cases are excluded from two-dimensional antenna arrays. However, the present invention is not limited to the antenna arrays exemplified in Table 5, but may select other antenna arrays.

Alternatively, in another example, 3 bits in Table 5 may be expressed in such a manner that 2 bits of the existing antennaPortsCount are distinguished from a new field (e.g., may be a field of 1 bit named verticalAntennaConfig but is not limited to such a name) of 1 bit.

When the value of verticalAntennaConfig is equal to 0 or does not exist, a CSI-RS for the vertical direction does not exist, and the number of antenna ports may be determined by Table 4.

When the value of verticalAntennaConfig is equal to 1, 4 CSI-RS antenna ports and 4 CSI-RS antenna ports may be respectively indicated in the horizontal and the vertical directions, if the value of antennaPortsCount of 2 bits is equal to '00'; 8 CSI-RS antenna ports and 2 CSI-RS antenna ports may be respectively indicated in the horizontal and the vertical directions, if the value of antennaPortsCount of 2 bits is equal to '01'; 8 CSI-RS antenna ports and 4 CSI-RS antenna ports may be respectively indicated in the horizontal and the vertical directions, if the value of antennaPortsCount of 2 bits is equal to '11'; and 8 CSI-RS antenna ports and 8 CSI-RS antenna ports may be respectively indicated in the horizontal and the vertical directions, if the value of antennaPortsCount of 2 bits is equal to '11'.

A CSI-RS pattern in the horizontal direction may be calculated as follows: (l',k') may be calculated by applying the number of CSI-RS antenna ports in the horizontal direction and resourceConfig of 5 bits to Table 1 or Table 2. A CSI-RS pattern in the horizontal direction may be calculated by applying the calculated (l',k') to Equation 1.

Meanwhile, a CSI-RS pattern in the vertical direction may be indicated according to the preset rules based on a CSI-RS pattern in the horizontal direction.

For example, a CSI-RS pattern in a case where the number of CSI-RS antenna ports is equal to 8 includes two CSI-RS patterns in a case where the number of CSI-RS antenna ports is equal to 4, as described above. When this relation is used, CSI-RS patterns in the case where the number of CSI-RS antenna ports is equal to 4 may be removed by two pairs. When the number of CSI-RS antenna ports in the horizontal direction is equal to 4, if one CSI-RS pattern is indicated in the horizontal direction, a CSI-RS pattern in the vertical direction may be a pattern which forms a pair with a CSI-RS pattern in the horizontal direction.

As an example, when the number of CSI-RS antenna ports in the horizontal direction is equal to 4, in the case of a normal CP, a pair of CSI-RS patterns 0 and 5, a pair of CSI-RS patterns 1 and 6, a pair of CSI-RS patterns 2 and 7, a pair of CSI-RS patterns 3 and 8, a pair of CSI-RS patterns 4 and 9, a pair of CSI-RS patterns 20 and 23, a pair of CSI-RS patterns 21 and 24, and a pair of CSI-RS patterns 22 and 25 may be removed. Accordingly, a CSI-RS pattern in the vertical direction may be 5 when a CSI-RS pattern in the horizontal direction is 0, a CSI-RS pattern in the vertical direction may be 6 when a CSI-RS pattern in the horizontal direction is 1, a CSI-RS pattern in the vertical direction may be 7 when a CSI-RS pattern in the horizontal direction is 2, a CSI-RS pattern in the vertical direction may be 8 when a CSI-RS pattern in the horizontal direction is 3, a CSI-RS pattern in the vertical direction may be 9 when a CSI-RS pattern in the horizontal direction is 4, a CSI-RS pattern in the vertical direction may be 0 when a CSI-RS pattern in the horizontal direction is 5, a CSI-RS pattern in the vertical direction may be 1 when a CSI-RS pattern in the horizontal direction is 6, a CSI-RS pattern in the vertical direction may be 2 when a CSI-RS pattern in the horizontal direction is 7, a CSI-RS pattern in the vertical direction may be 3 when a CSI-RS pattern in the horizontal direction is 8, a CSI-RS pattern in the vertical direction may be 4 when a CSI-RS pattern in the horizontal direction is 9, a CSI-RS pattern in the vertical direction may be 23 when a CSI-RS pattern in the horizontal direction is 20, a CSI-RS pattern in the vertical direction may be 24 when a CSI-RS pattern in the horizontal direction is 21, a CSI-RS pattern in the vertical direction may be 25 when a CSI-RS pattern in the horizontal direction is 22, a CSI-RS pattern in the vertical direction may be 20 when a CSI-RS pattern in the horizontal direction is 23, a CSI-RS pattern in the vertical direction may be 21 when a CSI-RS pattern in the horizontal direction is 24, and a CSI-RS pattern in the vertical direction may be 22 when a CSI-RS pattern in the horizontal direction is 25.

Figure 6:
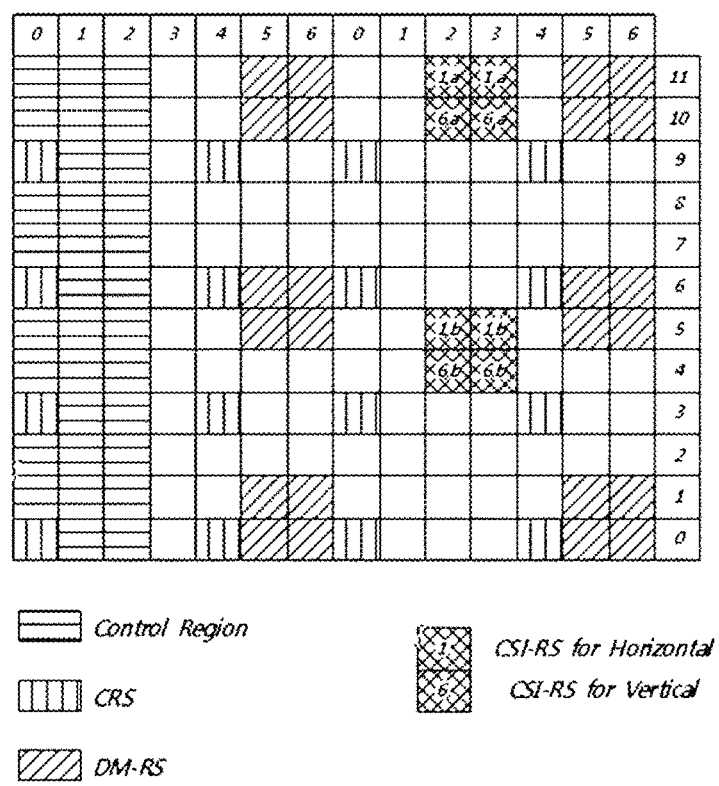
FIGS. 6 to 9 each illustrate an example of a CSI-RS pattern for a horizontal antenna and that of a CSI-RS pattern for a vertical antenna in a first embodiment of the present invention.

FIG. 6 illustrates, as an example, a case where, when a 4×4 antenna array is used, a CSI-RS pattern in the vertical direction is indicated as 6 if a CSI-RS pattern in the horizontal direction is indicated as 1.

Meanwhile, when the number of CSI-RS antenna ports in the horizontal direction is equal to 4, in the case of an extended CP, a pair of CSI-RS patterns 0 and 4, a pair of CSI-RS patterns 1 and 5, a pair of CSI-RS patterns 2 and 6, a pair of CSI-RS patterns 3 and 7, a pair of CSI-RS patterns 16 and 19, a pair of CSI-RS patterns 17 and 20, and a pair of CSI-RS patterns 18 and 21 may be removed. Accordingly, a CSI-RS pattern in the vertical direction may be 4 when a CSI-RS pattern in the horizontal direction is 0, a CSI-RS pattern in the vertical direction may be 5 when a CSI-RS pattern in the horizontal direction is 1, a CSI-RS pattern in the vertical direction may be 6 when a CSI-RS pattern in the horizontal direction is 2, a CSI-RS pattern in the vertical direction may be 7 when a CSI-RS pattern in the horizontal direction is 3, a CSI-RS pattern in the vertical direction may be 0 when a CSI-RS pattern in the horizontal direction is 4, a CSI-RS pattern in the vertical direction may be 1 when a CSI-RS pattern in the horizontal direction is 5, a CSI-RS pattern in the vertical direction may be 2 when a CSI-RS pattern in the horizontal direction is 6, a CSI-RS pattern in the vertical direction may be 3 when a CSI-RS pattern in the horizontal direction is 7, a CSI-RS pattern in the vertical direction may be 19 when a CSI-RS pattern in the horizontal direction is 16, a CSI-RS pattern in the vertical direction may be 20 when a CSI-RS pattern in the horizontal direction is 17, a CSI-RS pattern in the vertical direction may be 21 when a CSI-RS pattern in the horizontal direction is 18, a CSI-RS pattern in the vertical direction may be 16 when a CSI-RS pattern in the horizontal direction is 19, a CSI-RS pattern in the vertical direction may be 17 when a CSI-RS pattern in the horizontal direction is 20, and a CSI-RS pattern in the vertical direction may be 18 when a CSI-RS pattern in the horizontal direction is 21.

As another example, when the number of CSI-RS antenna ports in the horizontal direction is equal to 4, in the case of a normal CP, a CSI-RS pattern in the vertical direction may be 4 when a CSI-RS pattern in the horizontal direction is 0; a CSI-RS pattern in the vertical direction may be 2 when a CSI-RS pattern in the horizontal direction is 1; a CSI-RS pattern in the vertical direction may be 3 when a CSI-RS pattern in the horizontal direction is 2; a CSI-RS pattern in the vertical direction may be 1 when a CSI-RS pattern in the horizontal direction is 3; a CSI-RS pattern in the vertical direction may be 0 when a CSI-RS pattern in the horizontal direction is 4; a CSI-RS pattern in the vertical direction may be 9 when a CSI-RS pattern in the horizontal direction is 5; a CSI-RS pattern in the vertical direction may be 7 when a CSI-RS pattern in the horizontal direction is 6; a CSI-RS pattern in the vertical direction may be 8 when a CSI-RS pattern in the horizontal direction is 7; a CSI-RS pattern in the vertical direction may be 6 when a CSI-RS pattern in the horizontal direction is 8; a CSI-RS pattern in the vertical direction may be 5 when a CSI-RS pattern in the horizontal direction is 9; a CSI-RS pattern in the vertical direction is may be when a CSI-RS pattern in the horizontal direction is 20; a CSI-RS pattern in the vertical direction is 22 when a CSI-RS pattern in the horizontal direction is 21; a CSI-RS pattern in the vertical direction may be 20 when a CSI-RS pattern in the horizontal direction is 22; a CSI-RS pattern in the vertical direction may be 24 when a CSI-RS pattern in the horizontal direction is 23; a CSI-RS pattern in the vertical direction may be 25 when a CSI-RS pattern in the horizontal direction is 24; and a CSI-RS pattern in the vertical direction may be 23 when a CSI-RS pattern in the horizontal direction is 25.

Meanwhile, when the number of CSI-RS antenna ports in the horizontal direction is equal to 4, in the case of an extended CP, a CSI-RS pattern in the vertical direction may be 1 when a CSI-RS pattern in the horizontal direction is 0; a CSI-RS pattern in the vertical direction may be 0 when a CSI-RS pattern in the horizontal direction is 1; a CSI-RS pattern in the vertical direction may be 3 when a CSI-RS pattern in the horizontal direction is 2; a CSI-RS pattern in the vertical direction may be 2 when a CSI-RS pattern in the horizontal direction is 3; a CSI-RS pattern in the vertical direction may be 5 when a CSI-RS pattern in the horizontal direction is 4; a CSI-RS pattern in the vertical direction may be 4 when a CSI-RS pattern in the horizontal direction is 5; a CSI-RS pattern in the vertical direction may be 7 when a CSI-RS pattern in the horizontal direction is 6; a CSI-RS pattern in the vertical direction may be 6 when a CSI-RS pattern in the horizontal direction is 7; a CSI-RS pattern in the vertical direction may be 17 when a CSI-RS pattern in the horizontal direction is 16; a CSI-RS pattern in the vertical direction may be 18 when a CSI-RS pattern in the horizontal direction is 17; a CSI-RS pattern in the vertical direction may be 16 when a CSI-RS pattern in the horizontal direction is 18; a CSI-RS pattern in the vertical direction may be 20 when a CSI-RS pattern in the horizontal direction is 19; a CSI-RS pattern in the vertical direction may be 21 when a CSI-RS pattern in the horizontal direction is 20; and a CSI-RS pattern in the vertical direction may be 19 when a CSI-RS pattern in the horizontal direction is 21.

The above-described rules may be applied to a case where the number of CSI-RS antenna ports in the horizontal direction is equal to 4 and the number of CSI-RS antenna ports in the vertical direction is less than or equal to 4. For example, the above-described rules may be applied to a case where the number of CSI-RS antenna ports in the horizontal direction is equal to 4 and the number of CSI-RS antenna ports in the vertical direction is equal to 2 or 4.

Meanwhile, when the number of CSI-RS antenna ports in the horizontal direction is equal to 8, in the case of a normal CP, CSI-RS patterns 0 and 4 both have an identical symbol number and an identical subcarrier number but have different slot numbers, and thus may form a pair. Therefore, in an example, a CSI-RS pattern in the vertical direction may be set to be 4 when a CSI-RS pattern in the horizontal direction is 0, and a CSI-RS pattern in the vertical direction may be set to be 0 when a CSI-RS pattern in the horizontal direction is 4.

When the number of CSI-RS antenna ports in the horizontal direction is equal to 8, in the case of a normal CP, CSI-RS patterns 1, 2, and 3 all have an identical symbol number and an identical slot number, and have respective subcarrier numbers which differ from one another by two; and CSI-RS patterns 20, 21, and 22 all have an identical symbol number and an identical slot number, and have respective subcarrier numbers which differ from one another by two.

In an example, a CSI-RS pattern in the vertical direction may be set to be 2 when a CSI-RS pattern in the horizontal direction is 1, a CSI-RS pattern in the vertical direction may be set to be 3 when a CSI-RS pattern in the horizontal direction is 2, a CSI-RS pattern in the vertical direction may be set to be 1 when a CSI-RS pattern in the horizontal direction is 3, a CSI-RS pattern in the vertical direction may be set to be 21 when a CSI-RS pattern in the horizontal direction is 20, a CSI-RS pattern in the vertical direction may be set to be 22 when a CSI-RS pattern in the horizontal direction is 21, and a CSI-RS pattern in the vertical direction may be set to be 20 when a CSI-RS pattern in the horizontal direction is 22.

Alternatively, a CSI-RS pattern in the vertical direction may be set to be 3 when a CSI-RS pattern in the horizontal direction is 1, a CSI-RS pattern in the vertical direction may be set to be 1 when a CSI-RS pattern in the horizontal direction is 2, a CSI-RS pattern in the vertical direction may be set to be 2 when a CSI-RS pattern in the horizontal direction is 3, a CSI-RS pattern in the vertical direction may be set to be 22 when a CSI-RS pattern in the horizontal direction is 20, a CSI-RS pattern in the vertical direction may be set to be 20 when a CSI-RS pattern in the horizontal direction is 21, and a CSI-RS pattern in the vertical direction may be set to be 21 when a CSI-RS pattern in the horizontal direction is 22.

The above-described rules may be applied to a case where the number of CSI-RS antenna ports in the horizontal direction is equal to 8 and the number of CSI-RS antenna ports in the vertical direction is less than or equal to 8. For example, the above-described rules may be applied to a case where the number of CSI-RS antenna ports in the horizontal direction is equal to 8 and the number of CSI-RS antenna ports in the vertical direction is equal to 2, 4, or 8.

Figure 7:
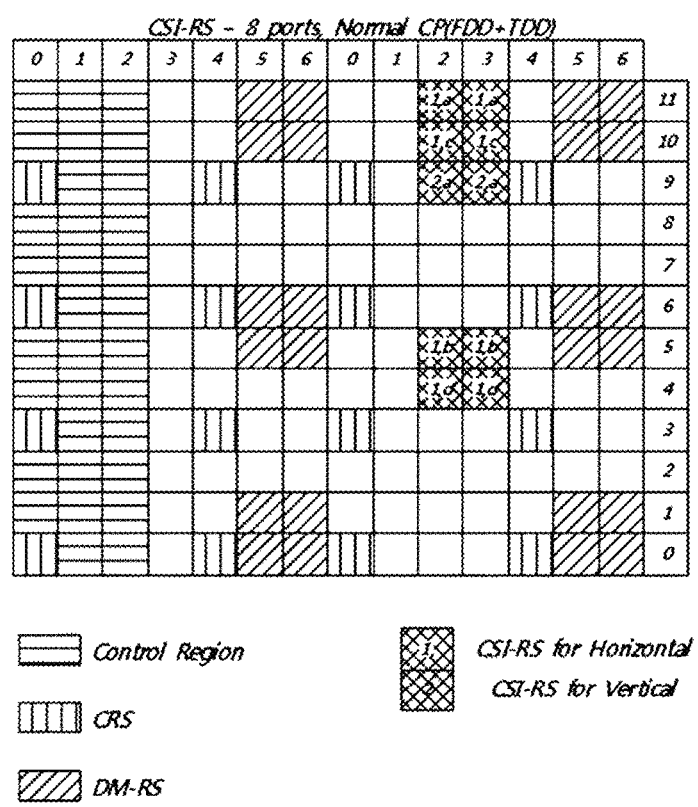

FIG. 7 illustrates, as an example, a case where, when an 8×2 antenna array is used, a CSI-RS pattern in the vertical direction is indicated as 2 if a CSI-RS pattern in the horizontal direction is indicated as 1.

Figure 8:
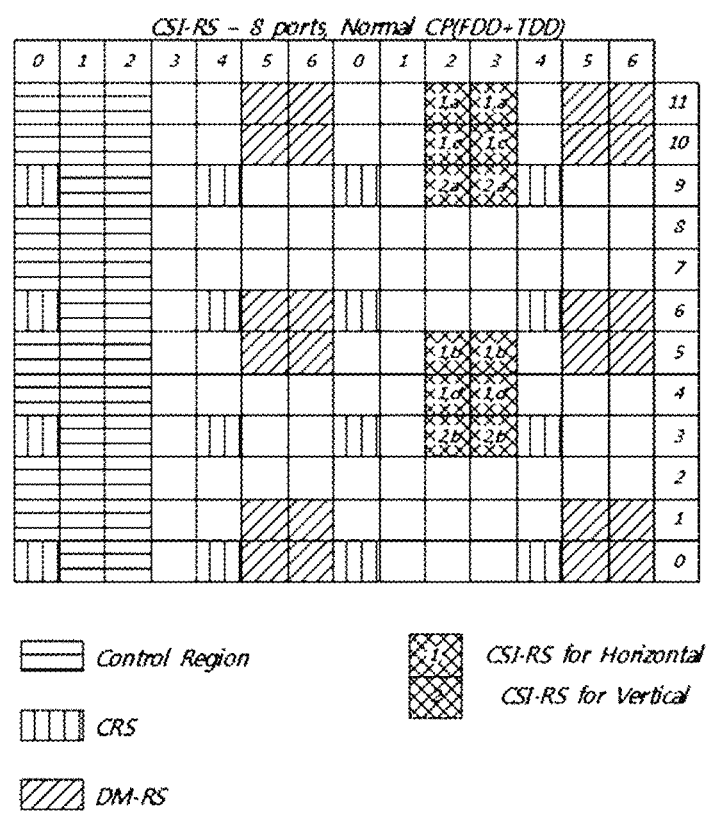

FIG. 8 illustrates, as another example, a case where, when an 8×4 antenna array is used, a CSI-RS pattern in the vertical direction is indicated as 2 if a CSI-RS pattern in the horizontal direction is indicated as 1.

Figure 9:
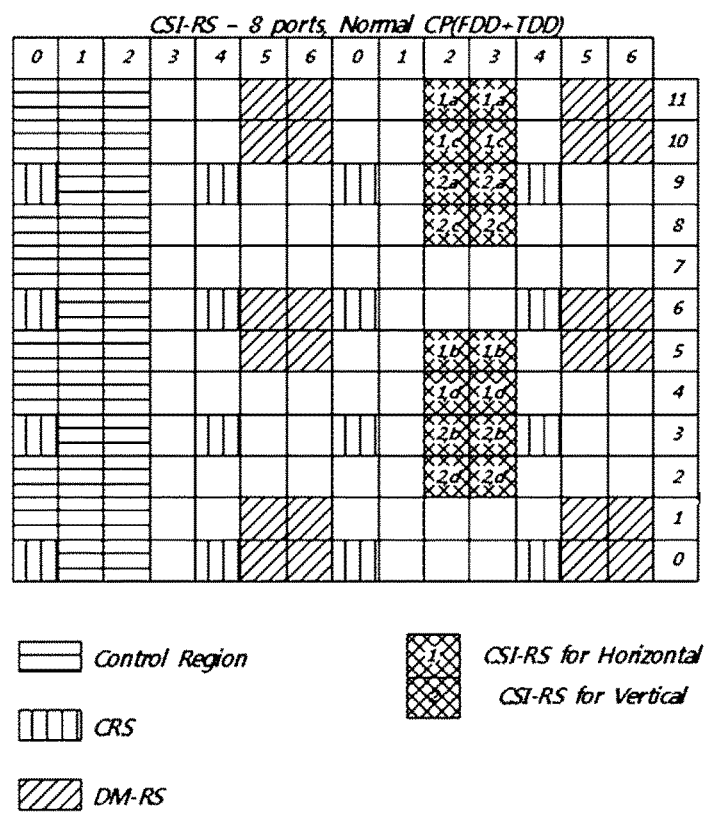

FIG. 9 illustrates, as still another example, a case where, when an 8×8 antenna array is used, a CSI-RS pattern in the vertical direction is indicated as 2 if a CSI-RS pattern in the horizontal direction is indicated as 1.

Meanwhile, when the number of CSI-RS antenna ports in the horizontal direction is equal to 8, in the case of an extended CP, CSI-RS patterns 0 and 1 both have an identical symbol number and an identical slot number but have different subcarrier numbers; and CSI-RS patterns 2 and 3 both have an identical symbol number and an identical slot number but have different subcarrier numbers, and thus CSI-RS patterns 0 and 1 and CSI-RS patterns 2 and 3 may be grouped as respective pairs. Accordingly, in an example, a CSI-RS pattern in the vertical direction may be set to be 1 when a CSI-RS pattern in the horizontal direction is 0, a CSI-RS pattern in the vertical direction may be set to be 0 when a CSI-RS pattern in the horizontal direction is 1, a CSI-RS pattern in the vertical direction may be set to be 3 when a CSI-RS pattern in the horizontal direction is 2, and a CSI-RS pattern in the vertical direction may be set to be 2 when a CSI-RS pattern in the horizontal direction is 3.

When the number of CSI-RS antenna ports in the horizontal direction is equal to 8, in the case of the extended CP, CSI-RS patterns 16, 17, and 18 all have an identical symbol number and an identical slot number, and have respective subcarrier numbers which differ from one another by one.

In an example, a CSI-RS pattern in the vertical direction may be set to be 17 when a CSI-RS pattern in the horizontal direction is 16, a CSI-RS pattern in the vertical direction may be set to be 18 when a CSI-RS pattern in the horizontal direction is 17, and a CSI-RS pattern in the vertical direction may be set to be 16 when a CSI-RS pattern in the horizontal direction is 18.

Alternatively, a CSI-RS pattern in the vertical direction may be set to be 18 when a CSI-RS pattern in the horizontal direction is 16, a CSI-RS pattern in the vertical direction may be set to be 16 when a CSI-RS pattern in the horizontal direction is 17, and a CSI-RS pattern in the vertical direction may be set to be 17 when a CSI-RS pattern in the horizontal direction is 18.

The above-described rules between the CSI-RS pattern in the horizontal direction and the CSI-RS pattern in the vertical direction have been presented for illustrative purposes, and use may be made of various rules which indicate a CSI-RS pattern in the vertical direction according to a CSI-RS pattern in the horizontal direction.

A second embodiment: 3 bits are added to CSI-RS configuration information for the horizontal direction.

In the second embodiment, 3 bits are added to antennaPortsCount of 2 bits, resourceConfing of 5 bits, and subfrämeConfig of 8 bits which are related to a CSI-RS for the horizontal direction. The added 3 bits may be 1 bit for indicating the number of antenna ports for CSI-RSs for the vertical direction, and 2 bits for indicating a relationship between a pattern of a CSI-RS for the horizontal direction and a pattern of a CSI-RS for the vertical direction.

Signaling of 1 bit for indicating the number of antenna ports for CSI-RSs for the vertical direction is used in a scheme similar to that of the above-described first embodiment, and a detailed description thereof will be omitted.

Signaling of 2 bits for indicating the relationship between a pattern of a CSI-RS for the horizontal direction and a pattern of a CSI-RS for the vertical direction may be used as described below.

When the number of antenna ports for CSI-RSs for the horizontal direction is equal to 8, in the case of a normal CP, a relationship defined by Equation 2 below may be set between a number A of a CSI-RS pattern in the horizontal direction and a number B of a CSI-RS pattern in the vertical direction.

$$B=(A+n+1)\bmod 5 \text{ for } A\in\{0,1,2,3,4\}$$

$$B=(A-20+n+1)\bmod 3+20 \text{ for } A\in\{20,21,22\} \quad \text{Equation 2}$$

In Equation 2, n represents a value delivered through the signaling of 2 bits for indicating the relationship between a pattern of a CSI-RS for the horizontal direction and a pattern of a CSI-RS for the vertical direction. n may be defined by $n\in\{0,1,2,3\}$ for $A\in\{0,1,2,3,4\}$, and n may be defined by $n\in\{0,1\}$ for $A\in\{20,21,22\}$.

These rules may be applied to a case where the number of CSI-RS antenna ports in the horizontal direction is equal to 8 and the number of CSI-RS antenna ports in the vertical direction is less than or equal to 8. For example, the above-described rules may be applied to a case where the number of CSI-RS antenna ports in the horizontal direction is equal to 8 and the number of CSI-RS antenna ports in the vertical direction is equal to 2, 4, or 8.

Figure 10:
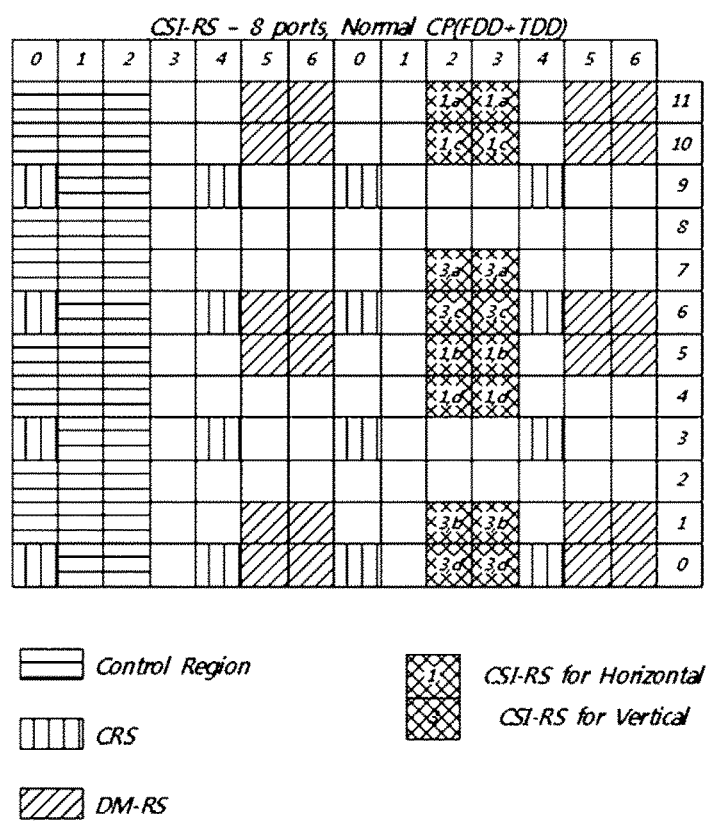
FIG. 10 illustrates an example of a CSI-RS pattern for a horizontal antenna and that of a CSI-RS pattern for a vertical antenna in a second embodiment of the present invention.

FIG. 10 illustrates, as an example, a case where, when an 8×8 antenna array is used, a CSI-RS pattern A for the horizontal direction is 1, a value n delivered through signaling of 2 bits is equal to 1, and a CSI-RS pattern B for the vertical direction is indicated as 3 by Equation 2.

When the number of antenna ports for CSI-RSs for the horizontal direction is equal to 8, in the case of an extended CP, a relationship defined by Equation 3 below may be set between a number A of a CSI-RS pattern in the horizontal direction and a number B of a CSI-RS pattern in the vertical direction.

$$B=(A+n+1)\bmod 4 \text{ for } A\in\{0,1,2,3\}$$

$$B=(A-16+n+1)\bmod 3+16 \text{ for } A\in\{16,17,18\} \quad \text{Equation 3}$$

In Equation 3, n represents a value delivered through the signaling of 2 bits for indicating the relationship between a pattern of a CSI-RS for the horizontal direction and a pattern of a CSI-RS for the vertical direction. n may be defined by $n\in\{0,1,2\}$ for $A\in\{0,1,2,3\}$, and n may be defined by $n\in\{0,1\}$ for $A\in\{16,17,18\}$.

These rules may be applied to a case where the number of CSI-RS antenna ports in the horizontal direction is equal to 8 and the number of CSI-RS antenna ports in the vertical direction is less than or equal to 8. For example, the above-described rules may be applied to a case where the number of CSI-RS antenna ports in the horizontal direction is equal to 8 and the number of CSI-RS antenna ports in the vertical direction is equal to 2, 4, or 8.

Meanwhile, when the number of CSI-RS antenna ports in the horizontal direction is equal to 4, a pattern of a CSI-RS for the vertical direction may be determined as in the above-described first embodiment.

Alternatively, when the number of CSI-RS antenna ports in the horizontal direction is equal to 4, signaling of 4 bits may exist for indicating the relationship between a pattern of a CSI-RS for the horizontal direction and a pattern of a CSI-RS for the vertical direction.

When the signaling of 4 bits is used, in the case of a normal CP, a relationship defined by Equation 4 below may be set between a number A of a CSI-RS pattern in the horizontal direction and a number B of a CSI-RS pattern in the vertical direction.

$$B=(A+n+1)\bmod 10 \text{ for } A\in\{0,1,\ldots,9\}$$

$$B=(A-20+n+1)\bmod 6+20 \text{ for } A\in\{20,21,\ldots,25\} \quad \text{Equation 4}$$

In Equation 4, n represents a value delivered through the signaling of 4 bits for indicating the relationship between a pattern of a CSI-RS for the horizontal direction and a pattern of a CSI-RS for the vertical direction. n may be defined by $n\in\{0,1,\ldots,8\}$ for $A\in\{0,1,\ldots,9\}$, and n may be defined by $n\in\{0,1,\ldots,4\}$ for $A\in\{20,21,\ldots,25\}$.

When the signaling of 4 bits is used, in the case of an extended CP, a relationship defined by Equation 5 below may be set between a number A of a CSI-RS pattern in the horizontal direction and a number B of a CSI-RS pattern in the vertical direction.

$$B=(A+n+1)\bmod 8 \text{ for } A\in\{0,1,\ldots,7\}$$

$$B=(A-16+n+1)\bmod 6+16 \text{ for } A\in\{16,17,\ldots,21\} \quad \text{Equation 5}$$

In Equation 5, n represents a value delivered through the signaling of 4 bits for indicating the relationship between a pattern of a CSI-RS for the horizontal direction and a pattern of a CSI-RS for the vertical direction. n may be defined by $n\in\{0,1,\ldots,6\}$ for $A\in\{0,1,\ldots,7\}$, and n may be defined by $n\in\{0,1,\ldots,4\}$ $A\in\{16,17,\ldots,21\}$.

Alternatively, signaling for indicating the relationship between a pattern of a CSI-RS for the horizontal direction and a pattern of a CSI-RS for the vertical direction may have 2 or 3 bits, and Equation 4 or Equation 5 may be used for the signaling of 2 or 3 bits.

A third embodiment: no bits are added.

In the third embodiment, no bits are added to antennaPortsCount of 2 bits, resourceConfing of 5 bits, and subfrämeConfig of 8 bits which are related to a CSI-RS for the horizontal direction.

Whether a CSI-RS for the vertical direction is transmitted, and the number of antenna ports for CSI-RSs for the vertical direction in a case where a CSI-RS for the vertical direction is transmitted, may be indicated by the number of antenna ports for CSI-RSs for the horizontal direction and resourceConfig of 5 bits. In the third embodiment, Table 1 and Table 2 used to indicate a pattern of a CSI-RS for the horizontal direction may be replaced by Table 6 below for a normal CP and Table 7 below for an extended CP.

ports for CSI-RSs for the horizontal direction is equal to 8 and the number of antenna ports for CSI-RSs for the vertical direction is equal to 2.

A case where the number of antenna ports for CSI-RSs for the horizontal direction is equal to 8 and CSI-RS patterns are

TABLE 6

| | | Number of CSI reference signals configured (horizontal) | | | | | | | | |
|---|---|---|---|---|---|---|---|---|---|---|
| | | 1 or 2 | | | 4 | | | 8 | | |
| | CSI reference signal configuration | (k', l') | $n_s$ mod 2 | Number of CSI reference signals configured (vertical) | (k', l') | $n_s$ mod 2 | Number of CSI reference signals configured (vertical) | (k', l') | $n_s$ mod 2 | Number of CSI reference signals configured (vertical) |
| Frame structure type 1 and 2 | 0 | (9, 5) | 0 | | (9, 5) | 0 | | (9, 5) | 0 | |
| | 1 | (11, 2) | 1 | | (11, 2) | 1 | | (11, 2) | 1 | |
| | 2 | (9, 2) | 1 | | (9, 2) | 1 | | (9, 2) | 1 | |
| | 3 | (7, 2) | 1 | | (7, 2) | 1 | | (7, 2) | 1 | |
| | 4 | (9, 5) | 1 | | (9, 5) | 1 | | (9, 5) | 1 | |
| | 5 | (8, 5) | 0 | | (8, 5) | 0 | | (9, 5) | 0 | 2 |
| | 6 | (10, 2) | 1 | | (10, 2) | 1 | | (11, 2) | 1 | 2 |
| | 7 | (8, 2) | 1 | | (8, 2) | 1 | | (9, 2) | 1 | 2 |
| | 8 | (6, 2) | 1 | | (6, 2) | 1 | | (7, 2) | 1 | 2 |
| | 9 | (8, 5) | 1 | | (8, 5) | 1 | | (9, 5) | 1 | 2 |
| | 10 | (3, 5) | 0 | | (9, 5) | 0 | 4 | (9, 5) | 0 | 4 |
| | 11 | (2, 5) | 0 | | (11, 2) | 1 | 4 | (11, 2) | 1 | 4 |
| | 12 | (5, 2) | 1 | | (9, 2) | 1 | 4 | (9, 2) | 1 | 4 |
| | 13 | (4, 2) | 1 | | (7, 2) | 1 | 4 | (7, 2) | 1 | 4 |
| | 14 | (3, 2) | 1 | | (9, 5) | 1 | 4 | (9, 5) | 1 | 4 |
| | 15 | (2, 2) | 1 | | (8, 5) | 0 | 4 | (9, 5) | 0 | 8 |
| | 16 | (1, 2) | 1 | | (10, 2) | 1 | 4 | (11, 2) | 1 | 8 |
| | 17 | (0, 2) | 1 | | (8, 2) | 1 | 4 | (9, 2) | 1 | 8 |
| | 18 | (3, 5) | 1 | | (6, 2) | 1 | 4 | (7, 2) | 1 | 8 |
| | 19 | (2, 5) | 1 | | (8, 5) | 1 | 4 | (9, 5) | 1 | 8 |
| Frame structure type 2 only | 20 | (11, 1) | 1 | | (11, 1) | 1 | | (11, 1) | 1 | |
| | 21 | (9, 1) | 1 | | (9, 1) | 1 | | (9, 1) | 1 | |
| | 22 | (7, 1) | 1 | | (7, 1) | 1 | | (7, 1) | 1 | |
| | 23 | (10, 1) | 1 | | (10, 1) | 1 | | (11, 1) | 1 | 2 |
| | 24 | (8, 1) | 1 | | (8, 1) | 1 | | (9, 1) | 1 | 2 |
| | 25 | (6, 1) | 1 | | (6, 1) | 1 | | (7, 1) | 1 | 2 |
| | 26 | (5, 1) | 1 | | (11, 1) | 1 | 4 | (11, 1) | 1 | 4 |
| | 27 | (4, 1) | 1 | | (9, 1) | 1 | 4 | (9, 1) | 1 | 4 |
| | 28 | (3, 1) | 1 | | (7, 1) | 1 | 4 | (7, 1) | 1 | 4 |
| | 29 | (2, 1) | 1 | | (10, 1) | 1 | 4 | (11, 1) | 1 | 8 |
| | 30 | (1, 1) | 1 | | (8, 1) | 1 | 4 | (9, 1) | 1 | 8 |
| | 31 | (0, 1) | 1 | | (6, 1) | 1 | 4 | (7, 1) | 1 | 8 |

Referring to Table 6, in the case of a normal CP, a case where the number of antenna ports for CSI-RSs for the horizontal direction is equal to 1 or 2; a case where the number of antenna ports for CSI-RSs for the horizontal direction is equal to 4 and CSI-RS patterns are 0 to 9 or 20 to 25; and a case where the number of antenna ports for CSI-RSs for the horizontal direction is equal to 8 and CSI-RS patterns are 0 to 4 or 20 to 23, are a case where only a CSI-RS for the horizontal direction is transmitted and a CSI-RS for the vertical direction is not transmitted, and are identical to the case shown in Table 1. The remaining cases are a case where a CSI-RS for the horizontal direction and a CSI-RS for the vertical direction are transmitted.

A case where the number of antenna ports for CSI-RSs for the horizontal direction is equal to 4 and CSI-RS patterns are 10 to 19 or 26 to 31, is a case where the number of antenna ports for CSI-RSs for the horizontal direction is equal to 4 and the number of antenna ports for CSI-RSs for the vertical direction is equal to 4.

A case where the number of antenna ports for CSI-RSs for the horizontal direction is equal to 8 and CSI-RS patterns are 5 to 9 or 23 to 25, is a case where the number of antenna ports for CSI-RSs for the horizontal direction is equal to 8 and the number of antenna ports for CSI-RSs for the vertical direction is equal to 2.

A case where the number of antenna ports for CSI-RSs for the horizontal direction is equal to 8 and CSI-RS patterns are 10 to 14 or 26 to 28, is a case where the number of antenna ports for CSI-RSs for the horizontal direction is equal to 8 and the number of antenna ports for CSI-RSs for the vertical direction is equal to 4.

A case where the number of antenna ports for CSI-RSs for the horizontal direction is equal to 8 and CSI-RS patterns are 15 to 19 or 29 to 31, is a case where the number of antenna ports for CSI-RSs for the horizontal direction is equal to 8 and the number of antenna ports for CSI-RSs for the vertical direction is equal to 8.

Accordingly, whether a CSI-RS for the vertical direction is transmitted, and the number of antenna ports for CSI-RSs for the vertical direction in a case where a CSI-RS for the vertical direction is transmitted, may be indicated by using antennaPortsCount of 2 bits and resourceConfing 5 bits.

As shown in Table 6, in the case of a normal CP, when the number of antenna ports for CSI-RSs for the horizontal direction is equal to 4, values of (l',k') are identical to one another if values of resourceConfig mod 10 are identical to one another when the value of resourceConfig ranges from 0 to 19. Accordingly, CSI-RS patterns in the horizontal direction are identical to one another. Values of (l',k') are identical to one another if values of resourceConfig-20 mod 6 are identical to one another when the value of resourceConfig ranges from 20 to 31. Accordingly, CSI-RS patterns in the horizontal direction are identical to one another.

As shown in Table 6, in the case of the normal CP, when the number of antenna ports for CSI-RSs for the horizontal direction is equal to 8, values of (l',k') are identical to one another if values of resourceConfig mod 5 are identical to one another when the value of resourceConfig ranges from 0 to 19. Accordingly, CSI-RS patterns in the horizontal direction are identical to one another. Values of (l',k') are identical to one another if values of resourceConfig-20 mod 3 are identical to one another when the value of resourceConfig ranges from 20 to 31. Accordingly, CSI-RS patterns in the horizontal direction are identical to one another.

A CSI-RS pattern in the vertical direction may be indicated according to the preset rules on the basis of a CSI-RS pattern in the horizontal direction. The preset rules may be similar to those of the above-described first embodiment.

As an example, when the number of antenna ports for CSI-RSs for the horizontal direction is equal to 4, a CSI-RS pattern in the vertical direction may be determined on the basis of the value of resourceConfig mod 10 in a case where the value of resourceConfig ranges from 0 to 19, and on the basis of the value of resourceConfig-20 mod 6 in a case where the value of resourceConfig ranges from 20 to 31.

Specifically, similarly to the first embodiment, a CSI-RS pattern in the vertical direction may be 5 when a CSI-RS pattern in the horizontal direction is 10, a CSI-RS pattern in the vertical direction may be 6 when a CSI-RS pattern in the horizontal direction is 11 a CSI-RS pattern in the vertical direction may be 7 when a CSI-RS pattern in the horizontal direction is 12, a CSI-RS pattern in the vertical direction may be 8 when a CSI-RS pattern in the horizontal direction is 13, a CSI-RS pattern in the vertical direction may be 9 when a CSI-RS pattern in the horizontal direction is 14, a CSI-RS pattern in the vertical direction may be 0 when a CSI-RS pattern in the horizontal direction is 15, a CSI-RS pattern in the vertical direction may be 1 when a CSI-RS pattern in the horizontal direction is 16, a CSI-RS pattern in the vertical direction may be 2 when a CSI-RS pattern in the horizontal direction is 17, a CSI-RS pattern in the vertical direction may be 3 when a CSI-RS pattern in the horizontal direction is 18, a CSI-RS pattern in the vertical direction may be 4 when a CSI-RS pattern in the horizontal direction is 19, a CSI-RS pattern in the vertical direction may be 23 when a CSI-RS pattern in the horizontal direction is 26, a CSI-RS pattern in the vertical direction may be 24 when a CSI-RS pattern in the horizontal direction is 27, a CSI-RS pattern in the vertical direction may be 25 when a CSI-RS pattern in the horizontal direction is 28, a CSI-RS pattern in the vertical direction may be 20 when a CSI-RS pattern in the horizontal direction is 29, a CSI-RS pattern in the vertical direction may be 21 when a CSI-RS pattern in the horizontal direction is 30, and a CSI-RS pattern in the vertical direction may be 22 when a CSI-RS pattern in the horizontal direction is 31.

As another example of the case where the number of antenna ports for CSI-RSs for the horizontal direction is equal to 4, a CSI-RS pattern in the vertical direction may be 4 when a CSI-RS pattern in the horizontal direction is 10, a CSI-RS pattern in the vertical direction may be 2 when a CSI-RS pattern in the horizontal direction is 11, a CSI-RS pattern in the vertical direction may be 3 when a CSI-RS pattern in the horizontal direction is 12, a CSI-RS pattern in the vertical direction may be 1 when a CSI-RS pattern in the horizontal direction is 13, a CSI-RS pattern in the vertical direction may be 0 when a CSI-RS pattern in the horizontal direction is 14, a CSI-RS pattern in the vertical direction may be 9 when a CSI-RS pattern in the horizontal direction is 15, a CSI-RS pattern in the vertical direction may be 7 when a CSI-RS pattern in the horizontal direction is 16, a CSI-RS pattern in the vertical direction may be 8 when a CSI-RS pattern in the horizontal direction is 17, a CSI-RS pattern in the vertical direction may be 6 when a CSI-RS pattern in the horizontal direction is 18, a CSI-RS pattern in the vertical direction may be 5 when a CSI-RS pattern in the horizontal direction is 19, a CSI-RS pattern in the vertical direction may be 21 when a CSI-RS pattern in the horizontal direction is 26, a CSI-RS pattern in the vertical direction may be 22 when a CSI-RS pattern in the horizontal direction is 27, a CSI-RS pattern in the vertical direction may be 20 when a CSI-RS pattern in the horizontal direction is 28, a CSI-RS pattern in the vertical direction may be 24 when a CSI-RS pattern in the horizontal direction is 29, a CSI-RS pattern in the vertical direction may be 25 when a CSI-RS pattern in the horizontal direction is 30, and a CSI-RS pattern in the vertical direction may be 23 when a CSI-RS pattern in the horizontal direction is 31.

As an example, when the number of antenna ports for CSI-RSs for the horizontal direction is equal to 8, a CSI-RS pattern in the vertical direction may be determined on the basis of the value of resourceConfig mod 5 in a case where the value of resourceConfig ranges from 0 to 19, and on the basis of the value of resourceConfig-20 mod 3 in a case where the value of resourceConfig ranges from 20 to 31.

Specifically, similarly to the first embodiment, a CSI-RS pattern in the vertical direction may be set to be 4 when CSI-RS patterns in the horizontal direction are 5, 10, and 15; a CSI-RS pattern in the vertical direction may be set to be 2 when CSI-RS patterns in the horizontal direction are 6, 11, and 16; a CSI-RS pattern in the vertical direction may be set to be 3 when CSI-RS patterns in the horizontal direction are 7, 12, and 17; a CSI-RS pattern in the vertical direction may be set to be 1 when CSI-RS patterns in the horizontal direction are 8, 13, and 18; a CSI-RS pattern in the vertical direction may be set to be 0 when CSI-RS patterns in the horizontal direction are 9, 14, and 19; a CSI-RS pattern in the vertical direction may be set to be 21 when CSI-RS patterns in the horizontal direction are 23, 26, and 29; a CSI-RS pattern in the vertical direction may be set to be 22 when CSI-RS patterns in the horizontal direction are 24, 27, and 30; and a CSI-RS pattern in the vertical direction may be set to be 20 when CSI-RS patterns in the horizontal direction are 25, 28, and 31.

Alternatively, as in the second embodiment, use may be made of bits for indicating a relationship between a CSI-RS pattern in the horizontal direction and a CSI-RS pattern in the vertical direction.

TABLE 7

| | | Number of CSI reference signals configured (horizontal) | | | | | | | |
|---|---|---|---|---|---|---|---|---|---|
| | | 1 or 2 | | | 4 | | | 8 | |
| | CSI reference signal configuration | (k', l') | a, mod2 | Number of CSI reference signals configured (vertical) | (k', l') | a, mod2 | Number of CSI reference signals configured (vertical) | (k', l') | a, mod2 | Number of CSI reference signals configured (vertical) |
| Frame structure type 1 and 2 | 0 | (11, 4) | 0 | | (11, 4) | 0 | | (11, 4) | 0 | |
| | 1 | (9, 4) | 0 | | (9, 4) | 0 | | (9, 4) | 0 | |
| | 2 | (10, 4) | 1 | | (10, 4) | 1 | | (18, 4) | 1 | |
| | 3 | (9, 4) | 1 | | (9, 4) | 1 | | (9, 4) | 1 | |
| | 4 | (5, 4) | 0 | | (3, 4) | 0 | | (18, 4) | 0 | 2 |
| | 5 | (3, 4) | 0 | | (3, 4) | 0 | | (9, 4) | 0 | 2 |
| | 6 | (4, 4) | 1 | | (4, 4) | 1 | | (10, 4) | 1 | 2 |
| | 7 | (3, 4) | 1 | | (3, 4) | 1 | | (9, 4) | 1 | 2 |
| | 8 | (5, 4) | 0 | | (11, 4) | 0 | 4 | (18, 4) | 0 | 4 |
| | 9 | (6, 4) | 0 | | (9, 4) | 0 | 4 | (9, 4) | 0 | 4 |
| | 10 | (2, 4) | 0 | | (10, 4) | 1 | 4 | (10, 4) | 1 | 4 |
| | 11 | (0, 4) | 0 | | (9, 4) | 1 | 4 | (9, 4) | 1 | 4 |
| | 12 | (7, 4) | 1 | | (6, 4) | 0 | 4 | (18, 4) | 0 | 8 |
| | 13 | (6, 4) | 1 | | (3, 4) | 0 | 4 | (9, 4) | 0 | 8 |
| | 14 | (1, 4) | 1 | | (4, 4) | 1 | 4 | (10, 4) | 1 | 8 |
| | 15 | (0, 4) | 1 | | (3, 4) | 1 | 4 | (9, 4) | 1 | 8 |
| Frame structure type 2 only | 16 | (11, 1) | 1 | | (11, 3) | 1 | | (11, 1) | 1 | |
| | 17 | (10, 1) | 1 | | (10, 3) | 1 | | (18, 1) | 1 | |
| | 18 | (9, 1) | 1 | | (9, 3) | 1 | | (9, 1) | 1 | |
| | 19 | (3, 1) | 1 | | (5, 3) | 1 | | (18, 1) | 1 | 2 |
| | 20 | (1, 1) | 1 | | (1, 3) | 1 | | (10, 1) | 1 | 2 |
| | 21 | (3, 1) | 1 | | (3, 3) | 1 | | (9, 1) | 1 | 2 |
| | 22 | (8, 1) | 1 | | (11, 1) | 1 | 4 | (18, 1) | 1 | 4 |
| | 23 | (7, 1) | 1 | | (10, 1) | 1 | 4 | (10, 1) | 1 | 4 |
| | 24 | (6, 1) | 1 | | (9, 8) | 1 | 4 | (9, 1) | 1 | 4 |
| | 25 | (2, 1) | 1 | | (5, 8) | 1 | 4 | (18, 1) | 1 | 8 |
| | 26 | (1, 1) | 1 | | (4, 8) | 1 | 4 | (18, 1) | 1 | 8 |
| | 27 | (6, 1) | 1 | | (3, 8) | 1 | 4 | (9, 1) | 1 | 8 |

Referring to Table 7, in the case of an extended CP, a case where the number of antenna ports for CSI-RSs for the horizontal direction is equal to 1 or 2; a case where the number of antenna ports for CSI-RSs for the horizontal direction is equal to 4 and CSI-RS patterns are 0 to 7 or 16 to 21; and a case where the number of antenna ports for CSI-RSs for the horizontal direction is equal to 8 and CSI-RS patterns are 0 to 3 or 16 to 18, are a case where only a CSI-RS the horizontal direction is transmitted and a CSI-RS the vertical direction is not transmitted, and are identical to the case shown in Table 2. The remaining cases are a case where a CSI-RS for the horizontal direction and a CSI-RS for the vertical direction are transmitted.

A case where the number of antenna ports for CSI-RSs for the horizontal direction is equal to 4 and CSI-RS patterns are 8 to 15 or 22 to 27 is a case where the number of antenna ports for CSI-RSs for the horizontal direction is equal to 4 and the number of antenna ports for CSI-RSs for the vertical direction is equal to 4.

A case where the number of antenna ports for CSI-RSs for the horizontal direction is equal to 8 and CSI-RS patterns are 4 to 7 or 19 to 21 is a case where the number of antenna ports for CSI-RSs for the horizontal direction is equal to 8 and the number of antenna ports for CSI-RSs for the vertical direction is equal to 2.

A case where the number of antenna ports for CSI-RSs for the horizontal direction is equal to 8 and CSI-RS patterns are 8 to 11 or 22 to 24 is a case where the number of antenna ports for CSI-RSs for the horizontal direction is equal to 8 and the number of antenna ports for CSI-RSs for the vertical direction is equal to 4.

A case where the number of antenna ports for CSI-RSs for the horizontal direction is equal to 8 and CSI-RS patterns are 12 to 15 or 25 to 27 is a case where the number of antenna ports for CSI-RSs for the horizontal direction is equal to 8 and the number of antenna ports for CSI-RSs for the vertical direction is equal to 8.

Accordingly, whether a CSI-RS for the vertical direction is transmitted, and the number of antenna ports for CSI-RSs for the vertical direction in a case where a CSI-RS for the vertical direction is transmitted, may be indicated by using antennaPortsCount of 2 bits and resourceConfing of 5 bits.

As shown in Table 7, in the case of an extended CP, when the number of antenna ports for CSI-RSs for the horizontal direction is equal to 4, values of (l', k') are identical to one another if values of resourceConfig mod 8 are identical to one another when the value of resourceConfig ranges from 0 to 15. Accordingly, CSI-RS patterns in the horizontal direction are identical to one another. Values of (l', k') are identical to one another if values of resourceConfig-16 mod 6 are identical to one another when the value of resourceConfig ranges from 16 to 27. Accordingly, CSI-RS patterns in the horizontal direction are identical to one another.

As shown in Table 7, in the case of the extended CP, when the number of antenna ports for CSI-RSs for the horizontal direction is equal to 8, values of (l', k') are identical to one another if values of resourceConfig mod 4 are identical to one another when the value of resourceConfig ranges from 0 to 15. Accordingly, CSI-RS patterns in the horizontal direction are identical to one another. Values of (l', k') are identical to one another if values of resourceConfig-16 mod 3 are identical to one another when the value of resource- Config ranges from 16 to 27. Accordingly, CSI-RS patterns in the horizontal direction are identical to one another.

A CSI-RS pattern in the vertical direction may be indicated according to the preset rules on the basis of a CSI-RS pattern in the horizontal direction. The preset rules may be similar to those of the above-described first embodiment.

As an example, when the number of antenna ports for CSI-RSs for the horizontal direction is equal to 4, a CSI-RS pattern in the vertical direction may be determined on the basis of the value of resourceConfig mod 8 in a case where the value of resourceConfig ranges from 0 to 15, and on the basis of the value of resourceConfig-16 mod 6 in a case where the value of resourceConfig ranges from 16 to 27.

Specifically, similarly to the first embodiment, a CSI-RS pattern in the vertical direction may be 4 when a CSI-RS pattern in the horizontal direction is 8, a CSI-RS pattern in the vertical direction may be 5 when a CSI-RS pattern in the horizontal direction is 9, a CSI-RS pattern in the vertical direction may be 6 when a CSI-RS pattern in the horizontal direction is 10, a CSI-RS pattern in the vertical direction may be 7 when a CSI-RS pattern in the horizontal direction is 11, a CSI-RS pattern in the vertical direction may be 0 when a CSI-RS pattern in the horizontal direction is 12, a CSI-RS pattern in the vertical direction may be 1 when a CSI-RS pattern in the horizontal direction is 13, a CSI-RS pattern in the vertical direction may be 2 when a CSI-RS pattern in the horizontal direction is 14, a CSI-RS pattern in the vertical direction may be 3 when a CSI-RS pattern in the horizontal direction is 15, a CSI-RS pattern in the vertical direction may be 19 when a CSI-RS pattern in the horizontal direction is 22, a CSI-RS pattern in the vertical direction may be 20 when a CSI-RS pattern in the horizontal direction is 23, a CSI-RS pattern in the vertical direction may be 21 when a CSI-RS pattern in the horizontal direction is 24, a CSI-RS pattern in the vertical direction may be 16 when a CSI-RS pattern in the horizontal direction is 25, a CSI-RS pattern in the vertical direction may be 17 when a CSI-RS pattern in the horizontal direction is 26, and a CSI-RS pattern in the vertical direction may be 18 when a CSI-RS pattern in the horizontal direction is 27.

As another example of the case where the number of antenna ports for CSI-RSs for the horizontal direction is equal to 4, a CSI-RS pattern in the vertical direction may be 1 when a CSI-RS pattern in the horizontal direction is 8, a CSI-RS pattern in the vertical direction may be 0 when a CSI-RS pattern in the horizontal direction is 9, a CSI-RS pattern in the vertical direction may be 3 when a CSI-RS pattern in the horizontal direction is 10, a CSI-RS pattern in the vertical direction may be 2 when a CSI-RS pattern in the horizontal direction is 11, a CSI-RS pattern in the vertical direction may be 5 when a CSI-RS pattern in the horizontal direction is 12, a CSI-RS pattern in the vertical direction may be 4 when a CSI-RS pattern in the horizontal direction is 13, a CSI-RS pattern in the vertical direction may be 7 when a CSI-RS pattern in the horizontal direction is 14, a CSI-RS pattern in the vertical direction may be 6 when a CSI-RS pattern in the horizontal direction is 15, a CSI-RS pattern in the vertical direction may be 17 when a CSI-RS pattern in the horizontal direction is 22, a CSI-RS pattern in the vertical direction may be 18 when a CSI-RS pattern in the horizontal direction is 23, a CSI-RS pattern in the vertical direction may be 16 when a CSI-RS pattern in the horizontal direction is 24, a CSI-RS pattern in the vertical direction may be 20 when a CSI-RS pattern in the horizontal direction is 25, a CSI-RS pattern in the vertical direction may be 21 when a CSI-RS pattern in the horizontal direction is 26, and a CSI-RS pattern in the vertical direction may be 19 when a CSI-RS pattern in the horizontal direction is 27.

As an example, when the number of antenna ports for CSI-RSs for the horizontal direction is equal to 8, a CSI-RS pattern in the vertical direction may be determined on the basis of the value of resourceConfig mod 4 in a case where the value of resourceConfig ranges from 0 to 19, and on the basis of the value of resourceConfig-16 mod 3 in a case where the value of resourceConfig ranges from 20 to 31.

Specifically, similarly to the first embodiment, a CSI-RS pattern in the vertical direction may be set to be 1 when CSI-RS patterns in the horizontal direction are 4, 8, and 12; a CSI-RS pattern in the vertical direction may be set to be 0 when CSI-RS patterns in the horizontal direction are 5, 9, and 13; a CSI-RS pattern in the vertical direction may be set to be 3 when CSI-RS patterns in the horizontal direction are 6, 10, and 14; a CSI-RS pattern in the vertical direction may be set to be 2 when CSI-RS patterns in the horizontal direction are 7, 11, and 15; a CSI-RS pattern in the vertical direction may be set to be 17 when CSI-RS patterns in the horizontal direction are 19, 22, and 25; a CSI-RS pattern in the vertical direction may be set to be 18 when CSI-RS patterns in the horizontal direction are 20, 23, and 26; and a CSI-RS pattern in the vertical direction may be set to be 20 when CSI-RS patterns in the horizontal direction are 21, 24, and 27.

Alternatively, as in the second embodiment, use may be made of bits for indicating a relationship between a CSI-RS pattern in the horizontal direction and a CSI-RS pattern in the vertical direction.

The above-described rules between the CSI-RS pattern in the horizontal direction and the CSI-RS pattern in the vertical direction have been presented for illustrative purposes, and use may be made of various rules which indicate a CSI-RS pattern in the vertical direction according to a CSI-RS pattern in the horizontal direction.

Meanwhile, the above-described embodiments of the present invention disclose that a CSI-RS for the horizontal direction and a CSI-RS for the vertical direction are transmitted in an identical subframe. However, in another embodiment of the present invention, a case may be considered in which a CSI-RS for the horizontal direction and a CSI-RS for the vertical direction are transmitted in different subframes having a predetermined interval therebetween (e.g., a subframe, which follows a subframe in which the CSI-RS for the horizontal direction is transmitted, is a subframe in which the CSI-RS for the vertical direction is transmitted).

At this time, whether a CSI-RS for the vertical direction is transmitted, and the number of antenna ports for CSI-RSs for the vertical direction in a case where a CSI-RS for the vertical direction is transmitted, may be indicated as in the above-described first, second, and third embodiments. Specifically, the former and the latter may be indicated by adding, to the existing signaling, 1 bit for indicating whether the CSI-RS for the vertical direction is transmitted (the first embodiment), or may be indicated by using antennaPortsCount of 2 bits, resourceConfing of 5 bits, and Table 6 or Table 7 (the third embodiment).

In this case, a CSI-RS pattern in the horizontal direction may be identical to a CSI-RS pattern in the vertical direction.

Figure 11:
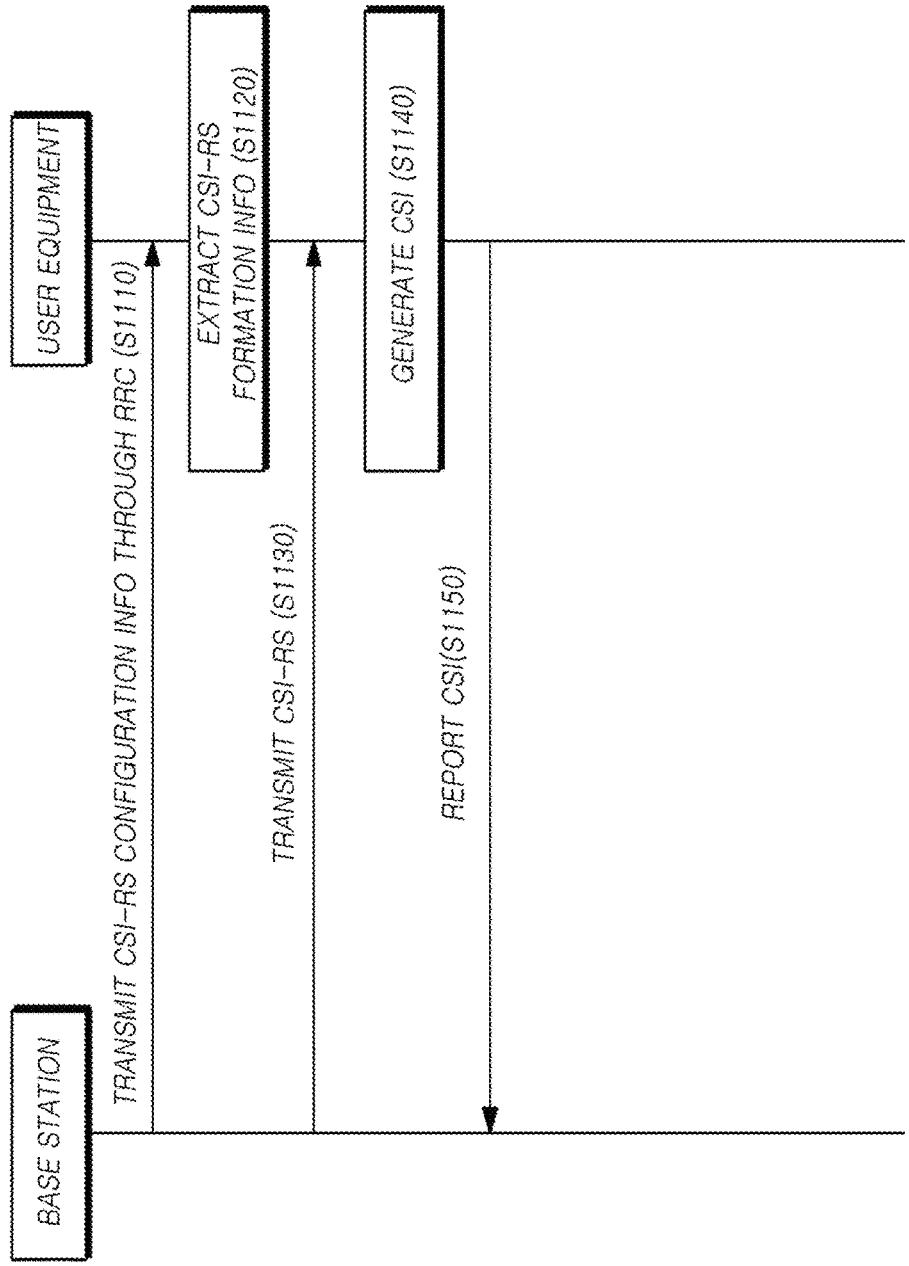
FIG. 11 illustrates a method for transmitting/receiving a CSI-RS according to an embodiment of the present invention.

FIG. 11 illustrates a method for transmitting/receiving a CSI-RS according to an embodiment of the present invention.

Referring to FIG. 11, a BS transmits CSI-RS configuration information through higher layer signaling such as RRC, in step S1110. The CSI-RS configuration information may include antennaPortsCount of 2 bits for indicating the number of CSI-RS antenna ports, resourceConfig of 5 bits for indicating a CSI-RS pattern, subframeConfig of 8 bits for indicating a subframe in which a CSI-RS is transmitted, and Pc for indicating CSI-RS transmission power.

In an example, the CSI-RS configuration information may further include 1 bit for indicating whether the transmission of a CSI-RS for the vertical direction exists in addition to the transmission of a CSI-RS for the horizontal direction. The added 1 bit may be added in such a manner that 2 bits of antennaPortsCount are changed to 3 bits, or a separate field is configured.

The added 1 bit may indicate whether the transmission of a CSI-RS for the vertical direction exists, and the added 1 bit and 2 bits for indicating the number of CSI-RS antenna ports may indicate the number of antenna ports for CSI-RSs for the horizontal direction and/or CSI-RSs for the vertical direction.

A CSI-RS pattern in the horizontal direction may be indicated by resourceConfig of 5 bits, and a CSI-RS pattern in the vertical direction may be determined by the preset rules on the basis of a CSI-RS pattern in the horizontal direction, or may be determined by the value of a separate field which indicates a relationship between the CSI-RS pattern in the horizontal direction and the CSI-RS pattern in the vertical direction.

In another example, whether a CSI-RS for the vertical direction is transmitted and the number of antenna ports for CSI-RSs for the vertical direction, may be indicated by a combination of the value antennaPortsCount of 2 bits and that of resourceConfig of 5 bits for indicating a CSI-RS pattern.

A CSI-RS pattern in the horizontal direction may be indicated by resourceConfig of 5 bits, and a CSI-RS pattern in the vertical direction may be determined by the preset rules on the basis of a CSI-RS pattern in the horizontal direction, or may be determined by the value of a separate field which indicates a relationship between the CSI-RS pattern in the horizontal direction and the CSI-RS pattern in the vertical direction.

The UE, which has received the CSI-RS configuration information, extracts the CSI-RS formation information in step S1120.

The UE determines whether a CSI-RS for the vertical direction is transmitted, on the basis of the received information. When it is determined that the CSI-RS for the vertical direction is transmitted, the UE extracts the number of antenna ports for CSI-RSs for the vertical direction, and determines a CSI-RS pattern in the vertical direction.

Then, the BS transmits a CSI-RS to the UE in step S1130. The UE, which has received the CSI-RS, generates CSI to be reported to the BS, in step S1140, and reports the generated CSI to the BS in step S1150.

Figure 12:
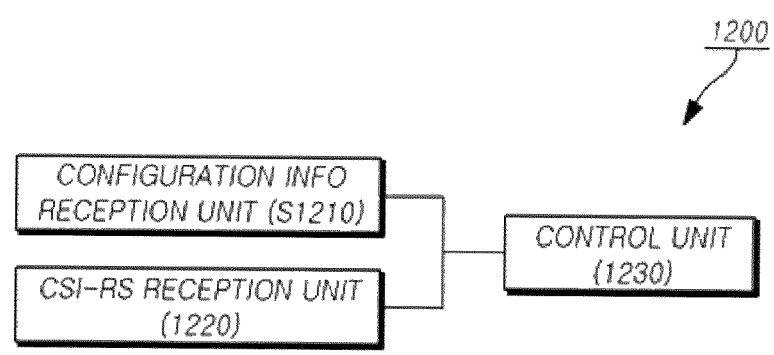
FIG. 12 illustrates a configuration of a user equipment according to an embodiment of the present invention.

FIG. 12 illustrates a configuration of a UE according to an embodiment of the present invention.

Referring to FIG. 12, the UE 1200 includes a configuration information reception unit 1210, a CSI-RS reception unit 1220, and a control unit 1230.

The configuration information reception unit 1210 receives CSI-RS configuration information through higher layer signaling, such as RRC. The CSI-RS configuration information may include antennaPortsCount of 2 bits for indicating the number of CSI-RS antenna ports, resourceConfig of 5 bits for indicating a CSI-RS pattern, subframe-Config of 8 bits for indicating a subframe in which a CSI-RS is transmitted, and Pc for indicating CSI-RS transmission power.

In an example, the CSI-RS configuration information may further include 1 bit for indicating whether the transmission of a CSI-RS for the vertical direction exists in addition to the transmission of a CSI-RS for the horizontal direction. The added 1 bit may be added in such a manner that 2 bits of antennaPortsCount are changed to 3 bits, or a separate field is configured.

The added 1 bit may indicate whether the transmission of a CSI-RS for the vertical direction exists, and the added 1 bit and 2 bits for indicating the number of CSI-RS antenna ports may indicate the number of antenna ports for CSI-RSs for the horizontal direction and/or CSI-RSs for the vertical direction.

A CSI-RS pattern in the horizontal direction may be indicated by resourceConfig of 5 bits, and a CSI-RS pattern in the vertical direction may be determined by the preset rules on the basis of a CSI-RS pattern in the horizontal direction, or may be determined by the value of a separate field which indicates a relationship between the CSI-RS pattern in the horizontal direction and the CSI-RS pattern in the vertical direction.

In another example, whether a CSI-RS for the vertical direction is transmitted and the number of antenna ports for CSI-RSs for the vertical direction, may be indicated by a combination of the value antennaPortsCount of 2 bits and that of resourceConfig of 5 bits for indicating a CSI-RS pattern.

A CSI-RS pattern in the horizontal direction may be indicated by resourceConfig of 5 bits, and a CSI-RS pattern in the vertical direction may be determined by the preset rules on the basis of a CSI-RS pattern in the horizontal direction, or may be determined by the value of a separate field which indicates a relationship between the CSI-RS pattern in the horizontal direction and the CSI-RS pattern in the vertical direction.

The control unit 1230 extracts CSI-RS formation information on the basis of the CSI-RS configuration information received by the configuration information reception unit 1210. The control unit 1230 determines whether a CSI-RS for the vertical direction is transmitted, on the basis of the received information. When it is determined that the CSI-RS for the vertical direction is transmitted, the control unit 1230 extracts the number of antenna ports for CSI-RSs for the vertical direction, and determines a CSI-Rs pattern in the vertical direction.

Then, the CSI-RS reception unit 1220 receives a CSI-RS transmitted by the BS.

Figure 13:
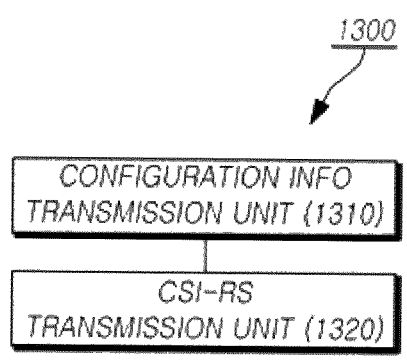
FIG. 13 illustrates a configuration of a base station according to an embodiment of the present invention.

FIG. 13 illustrates a configuration of a BS according to an embodiment of the present invention.

Referring to FIG. 13, the BS 1300 includes a configuration information transmission unit 1310 and a CSI-RS transmission unit 1320.

The configuration information transmission unit 1310 transmits CSI-RS configuration information through higher layer signaling, such as RRC. The CSI-RS configuration information may include antennaPortsCount of 2 bits for indicating the number of CSI-RS antenna ports, resource-Config of 5 bits for indicating a CSI-RS pattern, subframe-Config of 8 bits for indicating a subframe in which a CSI-RS is transmitted, and Pc for indicating CSI-RS transmission power.

In an example, the CSI-RS configuration information may further include 1 bit for indicating whether the transmission of a CSI-RS for the vertical direction exists in addition to the transmission of a CSI-RS for the horizontal direction. The added 1 bit may be added in such a manner that 2 bits of antennaPortsCount are changed to 3 bits, or a separate field is configured.

The added 1 bit may indicate whether the transmission of a CSI-RS for the vertical direction exists, and the added 1 bit and 2 bits for indicating the number of CSI-RS antenna ports may indicate the number of antenna ports for CSI-RSs for the horizontal direction and/or CSI-RSs for the vertical direction.

A CSI-RS pattern in the horizontal direction may be indicated by resourceConfig of 5 bits, and a CSI-RS pattern in the vertical direction may be determined by the preset rules on the basis of a CSI-RS pattern in the horizontal direction, or may be determined by the value of a separate field which indicates a relationship between the CSI-RS pattern in the horizontal direction and the CSI-RS pattern in the vertical direction.

In another example, whether a CSI-RS for the vertical direction is transmitted and the number of antenna ports for CSI-RSs for the vertical direction, may be indicated by a combination of the value antennaPortsCount of 2 bits and that of resourceConfig of 5 bits for indicating a CSI-RS pattern.

A CSI-RS pattern in the horizontal direction may be indicated by resourceConfig of 5 bits, and a CSI-RS pattern in the vertical direction may be determined by the preset rules on the basis of a CSI-RS pattern in the horizontal direction, or may be determined by the value of a separate field which indicates a relationship between the CSI-RS pattern in the horizontal direction and the CSI-RS pattern in the vertical direction.

Then, the CSI-RS transmission unit 1320 transmits a CSI-RS.

The above description is only an illustrative description of the technical idea of the present invention, and those having ordinary knowledge in the technical field, to which the present invention pertains, will appreciate that various changes and modifications may be made to the embodiments described herein without departing from the essential features of the present invention. Therefore, the embodiments disclosed in the present invention are intended not to limit but to describe the technical idea of the present invention, and thus do not limit the scope of the technical idea of the present invention. The protection scope of the present invention should be construed based on the appended claims, and all of the technical ideas included within the scope equivalent to the appended claims should be construed as being included within the right scope of the present invention.

The invention claimed is:

1. A user equipment for receiving a Channel Status Information Reference Signal (CSI-RS) transmitted by a base station, the user equipment comprising:
a receiver configured to receive, from the base station, CSI-RS configuration information including information on a number of CSI-RS antenna ports for a horizontal antenna in an antenna array of the base station, and information indicating a CSI-RS pattern used for a CSI-RS for the horizontal antenna in a particular subframe; and
a controller configured to extract a number of CSI-RS antenna ports for a vertical antenna and a CSI-RS pattern for the vertical antenna, based on the number of the CSI-RS antenna ports for the horizontal antenna and the information indicating the CSI-RS pattern for the horizontal antenna, when it is determined that a CSI-RS for the vertical antenna is transmitted,
wherein the CSI-RS configuration information comprises information of 1 bit or 3 bits which indicates whether the CSI-RS for the vertical antenna is used, and
wherein the controller determines a number of antenna ports used to transmit the CSI-RS based on the information of 1 bit or 3 bits which indicated whether the CSI-RS for the vertical antenna is used and the information on the number of the CSI-RS antenna ports for the horizontal antenna.

2. The user equipment as claimed in claim 1, wherein the number of the CSI-RS antenna ports for the vertical antenna is determined based on the number of the CSI-RS antenna ports for the horizontal antenna.

3. The user equipment as claimed in claim 1, wherein the CSI-RS configuration information further comprises information indicating a relation between the CSI-RS pattern for the vertical antenna and the CSI-RS pattern for the horizontal antenna, and wherein the CSI-RS pattern for the vertical antenna is determined based on the information indicating the relation and the information indicating the CSI-RS pattern for the horizontal antenna.

4. A method in which a user equipment receives a Channel Status Information Reference Signal (CSI-RS) transmitted by a base station, the method comprising:
receiving, from the base station, CSI-RS configuration information including information on a number of CSI-RS antenna ports for a horizontal antenna in an antenna array of the base station, information of 1 bit or 3 bits which indicates whether the CSI-RS for the vertical antenna is used, and information indicating a CSI-RS pattern used for the CSI-RS for the horizontal antenna in a particular subframe; and
extracting a number of CSI-RS antenna ports for a vertical antenna and a CSI-RS pattern for the vertical antenna, based on the number of the CSI-RS antenna ports for the horizontal antenna and the information indicating the CSI-RS pattern for the horizontal antenna, when it is determined that a CSI-RS for the vertical antenna is transmitted; and
determining a number of antenna ports used to transmit the CSI-RS based on the information of 1 bit or 3 bits which indicates whether the CSI-RS for the vertical antenna is used and the information on the number of the CSI-RS antenna ports for the horizontal antenna.

5. The method as claimed in claim 4, wherein the number of the CSI-RS antenna ports for the vertical antenna is determined based on the number of the CSI-RS antenna ports for the horizontal antenna.

6. The method as claimed in claim 4, wherein the CSI-RS configuration information further comprises information indicating a relation between the CSI-RS pattern for the vertical antenna and the CSI-RS pattern for the horizontal antenna, and
wherein the CSI-RS pattern for the vertical antenna is determined based on the information indicating the relation and the information indicating the CSI-RS pattern for the horizontal antenna.

7. A base station for transmitting a Channel Status Information Reference Signal (CSI-RS), the base station comprising:
a transmitter configured to transmit CSI-RS configuration information including information on a number of CSI-RS antenna ports for a horizontal antenna, and information indicating a CSI-RS pattern used for a CSI-RS for the horizontal antenna in a particular subframe; and an antenna array configured to transmit the CSI-RS for the horizontal antenna and a CSI-RS for a vertical antenna, wherein a number of CSI-RS antenna ports for the vertical antenna and a CSI-RS pattern for the vertical antenna are determined based on the number of the CSI-RS antenna ports for the horizontal antenna and the information indicating the CSI-RS pattern for the horizontal antenna, when the CSI-RS for the vertical antenna is transmitted, wherein the CSI-RS configuration information comprises information of 1 bit or 3 bits which indicates whether the CSI-RS for the vertical antenna is used, and wherein a number of antenna ports used to transmit the CSI-RS is determined based on the information of 1 bit or 3 bits which indicated whether the CSI-RS for the vertical antenna is used and the information on the number of the CSI-RS antenna ports for the horizontal antenna.

8. The base station as claimed in claim 7, wherein the number of the CSI-RS antenna ports for the vertical antenna is determined based on the number of the CSI-RS antenna ports for the horizontal antenna.

9. The base station as claimed in claim 7, wherein the CSI-RS configuration information further comprises information indicating a relation between the CSI-RS pattern for the vertical antenna and the CSI-RS pattern for the horizontal antenna, and wherein the CSI-RS pattern for the vertical antenna is determined based on the information indicating the relation and the information indicating the CSI-RS pattern for the horizontal antenna.

10. A method for transmitting a Channel Status Information Reference Signal (CSI-RS) by a base station, the method comprising:

transmitting CSI-RS configuration information including information on a number of CSI-RS antenna ports for a horizontal antenna in an antenna array of the base station, and information indicating a CSI-RS pattern used for a CSI-RS for the horizontal antenna in a particular subframe; and transmitting the CSI-RS for the horizontal antenna, a CSI-RS for a vertical antenna, or both, wherein a number of CSI-RS antenna ports for the vertical antenna and a CSI-RS pattern for the vertical antenna are determined based on the number of the CSI-RS antenna ports for the horizontal antenna and the information indicating the CSI-RS pattern for the horizontal antenna, when the CSI-RS for the vertical antenna is transmitted, wherein the CSI-RS configuration information comprises information of 1 bit or 3 bits which indicates whether the CSI-RS for the vertical antenna is used, and wherein a number of antenna ports used to transmit the CSI-RS is determined based on the information of 1 bit or 3 bits which indicated whether the CSI-RS for the vertical antenna is used and the information on the number of the CSI-RS antenna ports for the horizontal antenna.

11. The method as claimed in claim 10, wherein the number of the CSI-RS antenna ports for the vertical antenna is determined based the number of the CSI-RS antenna ports for the horizontal antenna.

12. The method as claimed in claim 10, wherein the CSI-RS configuration information further comprises information indicating a relation between the CSI-RS pattern for the vertical antenna and the CSI-RS pattern for the horizontal antenna, and wherein the CSI-RS pattern for the vertical antenna is determined based on the information indicating the relation and the information indicating the CSI-RS pattern for the horizontal antenna.

* * * * *